(12) United States Patent
Blanton et al.

(10) Patent No.: US 9,862,390 B2
(45) Date of Patent: Jan. 9, 2018

(54) EXPANDED PROTOCOL ADAPTER FOR IN-VEHICLE NETWORKS

(75) Inventors: Robin Blanton, Grosse Ile, MI (US);
Roger Leon Van Elslander, Warren, MI (US); David M. Such, Greenwood, IN (US)

(73) Assignee: DEARBORN GROUP, INC., Farmington Hills, MI (US)

( * ) Notice: Subject to any disclaimer, the term of this patent is extended or adjusted under 35 U.S.C. 154(b) by 11 days.

(21) Appl. No.: 13/410,606

(22) Filed: Mar. 2, 2012

(65) Prior Publication Data
US 2012/0198120 A1   Aug. 2, 2012

Related U.S. Application Data

(63) Continuation of application No. 11/593,762, filed on Nov. 7, 2006, now abandoned, which is a continuation-in-part of application No. 10/970,042, filed on Oct. 21, 2004, now abandoned, which is a continuation of application No. 09/942,130, filed on Aug. 29, 2001, now Pat. No. 7,152,133.

(60) Provisional application No. 60/229,008, filed on Aug. 30, 2000.

(51) Int. Cl.
| | |
|---|---|
| *G06F 13/36* | (2006.01) |
| *B60W 50/04* | (2006.01) |
| *H04L 12/861* | (2013.01) |
| *H04L 29/08* | (2006.01) |
| *H04L 29/06* | (2006.01) |
| *B60W 50/02* | (2012.01) |
| *B60W 50/00* | (2006.01) |
| *H04L 12/40* | (2006.01) |

(52) U.S. Cl.
CPC .......... *B60W 50/045* (2013.01); *H04L 49/90* (2013.01); *H04L 67/04* (2013.01); *H04L 67/12* (2013.01); *H04L 69/18* (2013.01); *B60W 50/0205* (2013.01); *B60W 2050/0045* (2013.01); *B60W 2050/046* (2013.01); *H04L 2012/40215* (2013.01)

(58) Field of Classification Search
CPC ...... G06F 13/385; G06F 13/387; G06F 13/36; G06F 13/42; G06F 13/40
USPC ........ 710/301–306, 315; 701/1, 29; 455/302
See application file for complete search history.

(56) References Cited

U.S. PATENT DOCUMENTS

| | | | | |
|---|---|---|---|---|
| 4,799,309 | A * | 1/1989 | Cinzori et al. ................. | 29/596 |
| 5,646,865 | A * | 7/1997 | Alfaro et al. ................ | 701/32.7 |
| 5,800,025 | A * | 9/1998 | McGrath et al. ................. | 303/7 |
| 6,202,103 | B1 * | 3/2001 | Vonbank ............... | G06F 11/221 710/15 |
| 6,259,891 | B1 * | 7/2001 | Allen ........................... | 455/3.02 |
| 6,338,010 | B1 * | 1/2002 | Sparks et al. .................... | 701/1 |
| 6,526,340 | B1 * | 2/2003 | Reul et al. ................... | 701/29.3 |

(Continued)

*Primary Examiner* — Tim T Vo
*Assistant Examiner* — Kim T. Huynh
(74) *Attorney, Agent, or Firm* — Warn Partners, P.C.

(57) ABSTRACT

A protocol adapter for transferring diagnostic signals between a vehicle network and a computer including a vehicle connector, a common connector plate, and a common electronics package. The vehicle connector is interfaced with the vehicle network. The common connector plate is interfaced with the vehicle connector. The common electronics package is interfaced with the common connector plate, and wirelessly transmits the diagnostic signals from the vehicle network to the computer.

21 Claims, 32 Drawing Sheets

(56) References Cited

U.S. PATENT DOCUMENTS 7,228,211 B1 *  6/2007  Lowrey et al. .............. 701/31.5

* cited by examiner

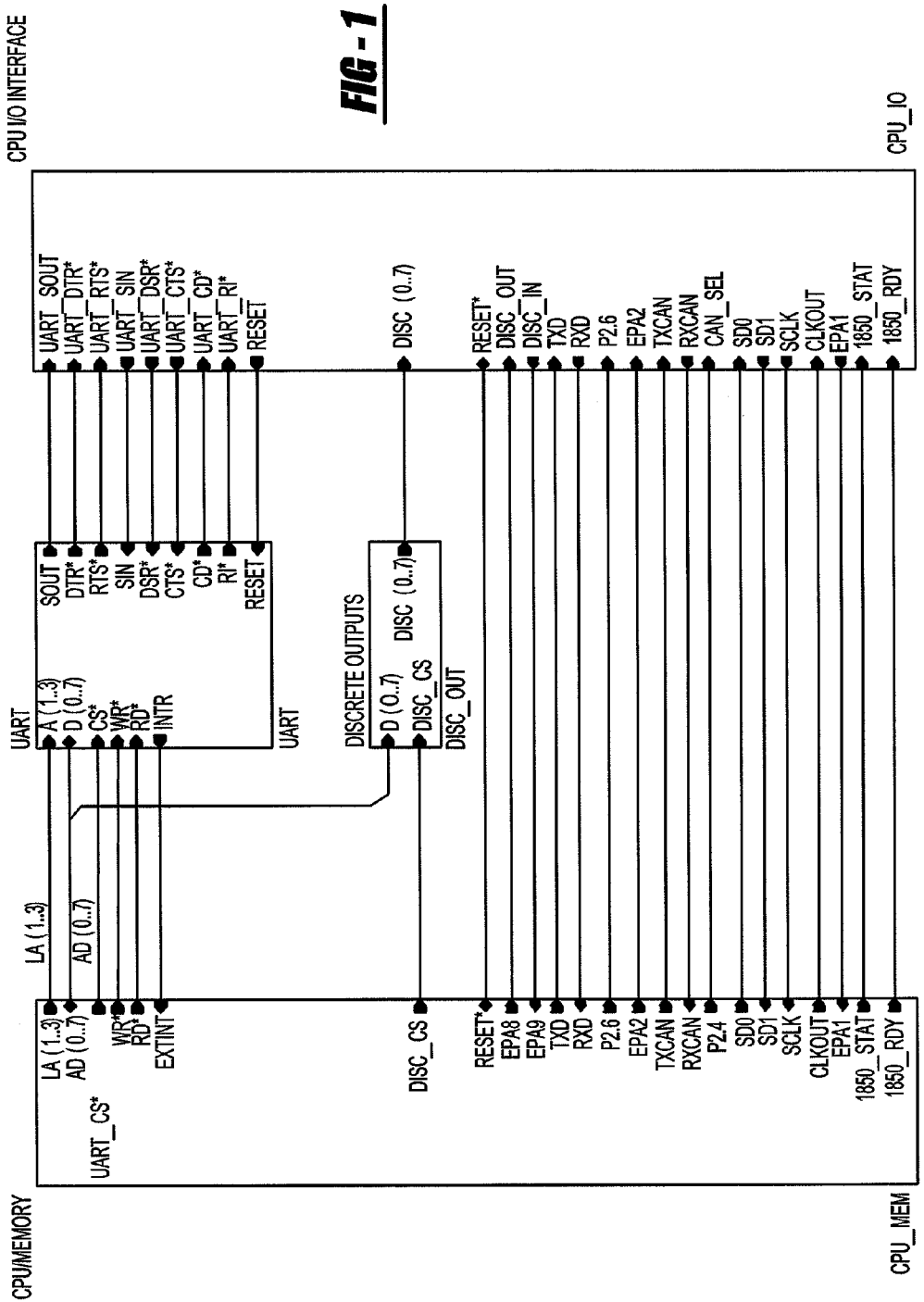

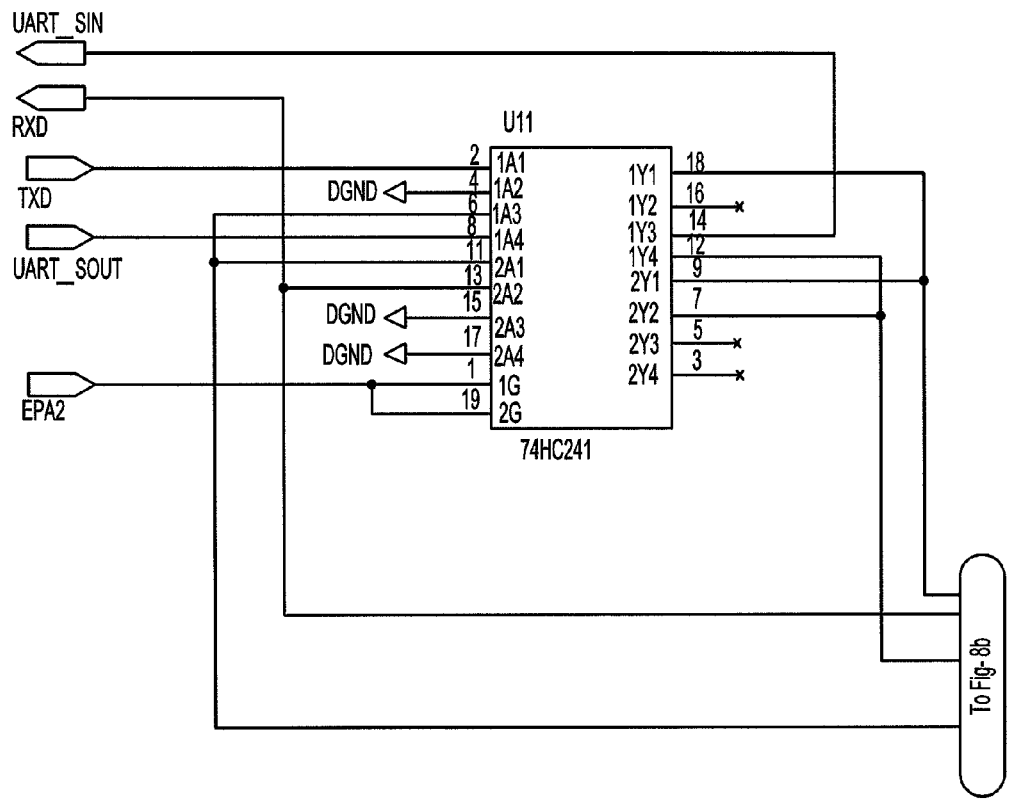
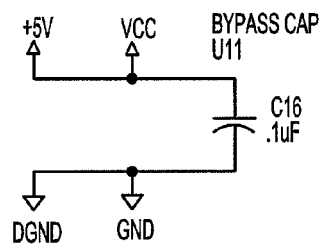
FIG - 8a

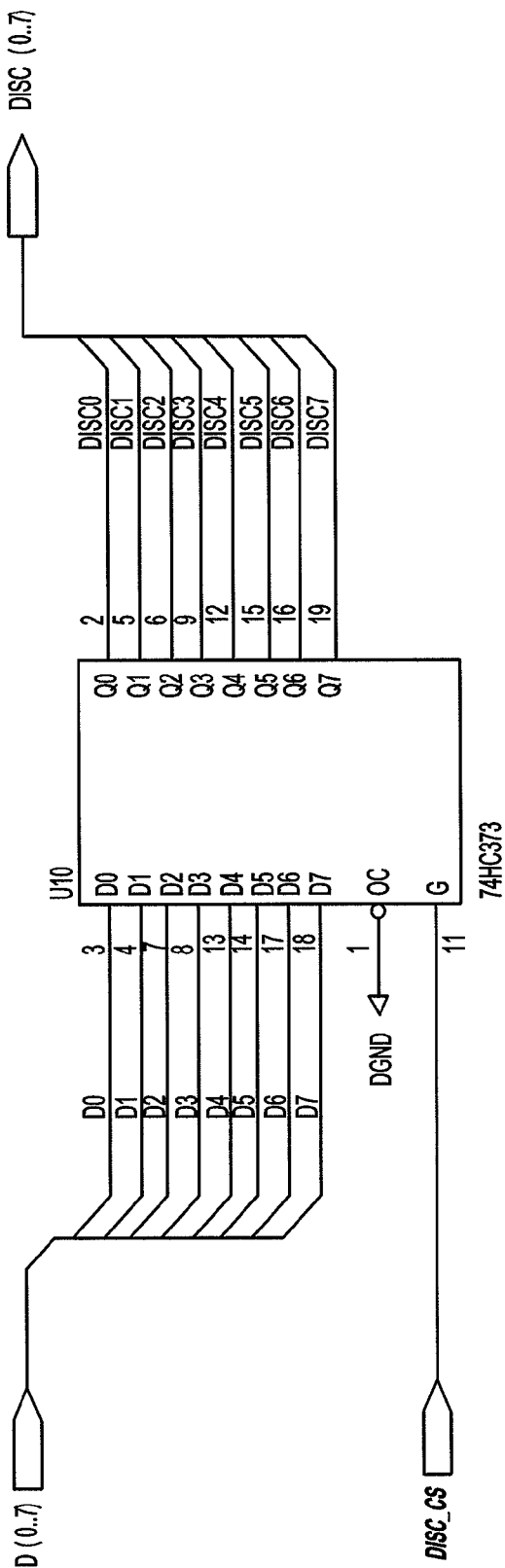
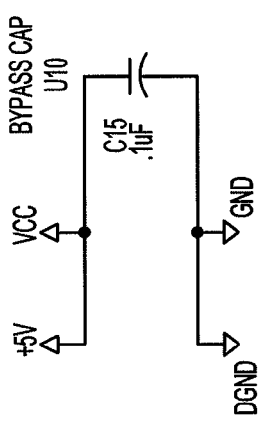
FIG-9

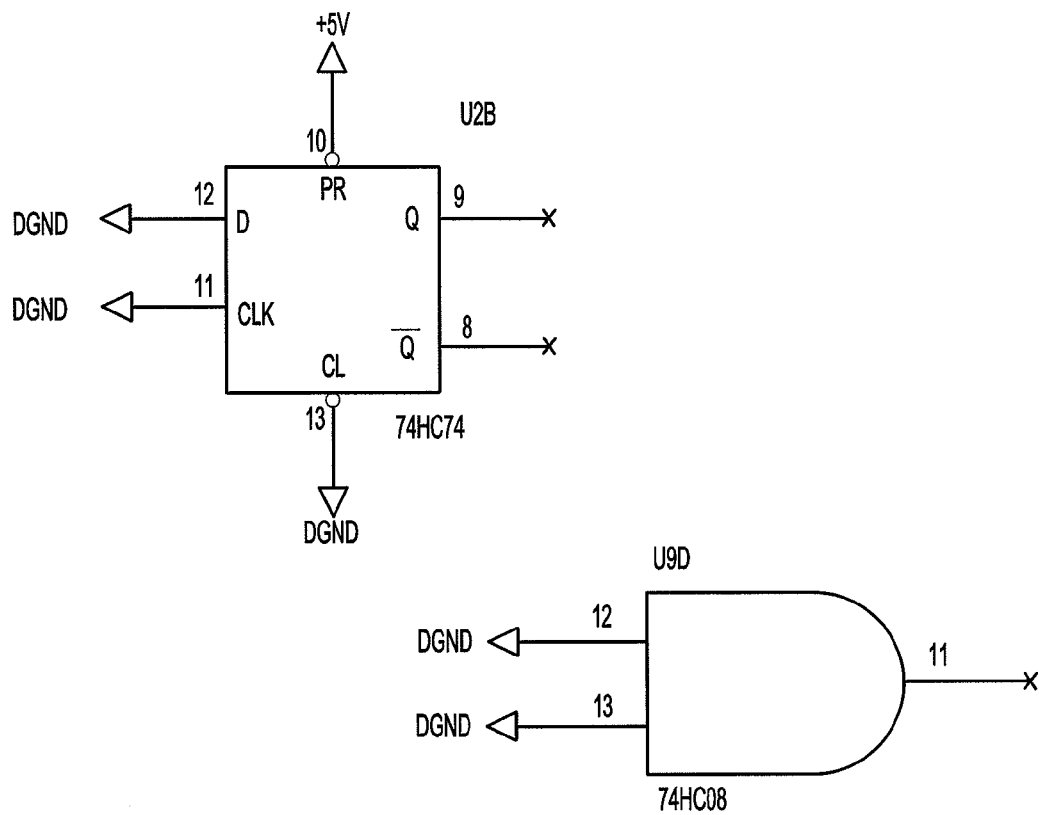
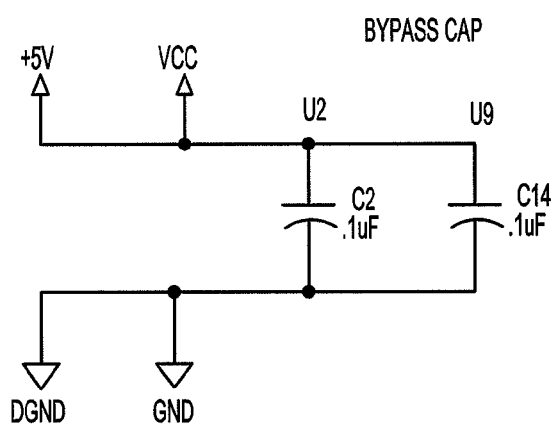
FIG - 10

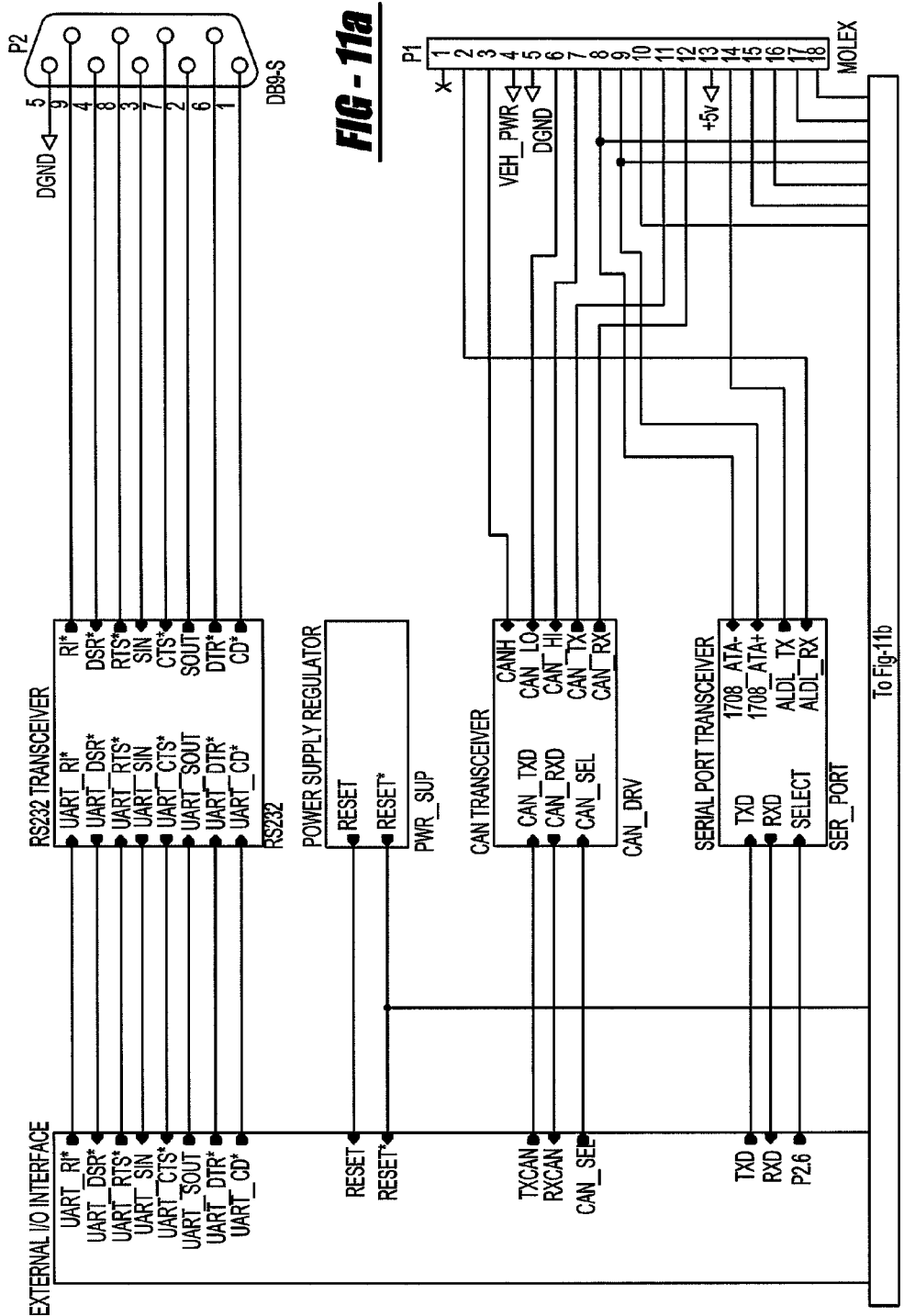

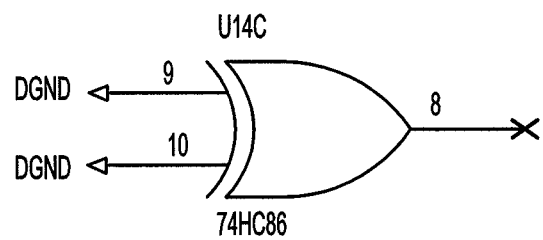
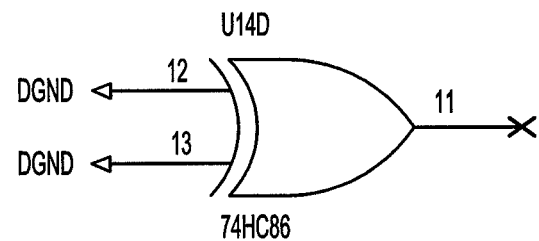
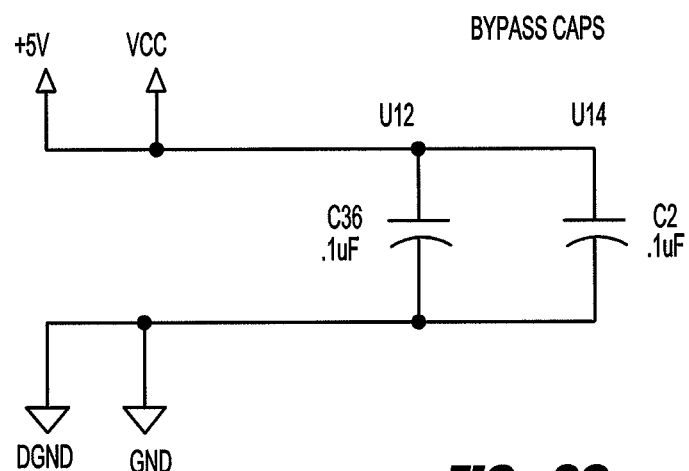
FIG-20

LED No.1 (red) - Black text, Power, indicates power on when illuminated.

FIG - 21

LED No.2 - Black text, Mode, plus red and green text as shown below:

| Red text | Corresponding meaning for LED when illuminated (red) |
|---|---|
| DPA | Normal operation of the DPA unit. Flashes red only when serial communications with PC is occurring. |

| Green text | Corresponding meaning for LED when illuminated (green) |
|---|---|
| PASS | Normal DPA operation is suspended, and the protocol pass-through functionality is activated. Indicated by steady flashing green. |

| Note: | Alternating red/green indicates reflash (reprogramming) in progress. |
|---|---|

FIG - 22

LED No.3 - Red and green text as shown below:

| Red text | Corresponding meaning for LED when illuminated (red) |
|---|---|
| J1939 | Dual-wire CAN is in operation: (J1939, Standard CAN or J2284 High-speed CAN) Flashes red when valid bus traffic is present. |

| Green text | Corresponding meaning for LED when illuminated (green) |
|---|---|
| SW CAN | Single-wire CAN is in operation: J2411 (if implemented). Flashes green for bus traffic. |

FIG - 23

DPA III PLUS - LED DESCRIPTIONS

LED No.4 - Red and green text as shown below:

| Red text | Corresponding meaning for LED when illuminated (red) |
|---|---|
| J1850 | Chrysler J1850 protocol is in operation (if implemented). Flashes red for bus traffic. |

| Green text | Corresponding meaning for LED when illuminated (green) |
|---|---|
| Class II | GM Class II J1850 protocol is in operation. Flashes green for bus traffic. |

*FIG - 24*

LED No.5 - Red and green text as shown below:

| Red text | Corresponding meaning for LED when illuminated (red) |
|---|---|
| J1708 | J1708 protocol is in operation. Flashes red for bus traffic. |

| Green text | Corresponding meaning for LED when illuminated (green) |
|---|---|
| UART | One of several UART protocols is in operation: GM Class I (ALDL), ISO 9141-2, ISO 9141-1989, ISO-9141-Special (for Case). Flashes green for bus traffic. |

*FIG - 25*

Note: See the diagram on the following page for LED locations on the DPA III unit.

DPA III PLUS - LED LAYOUT DIAGRAM

Note: Characters within parenthesis refer to schematic designations (Fig-17)

EXPANDED PROTOCOL ADAPTER FOR IN-VEHICLE NETWORKS

CROSS-REFERENCE TO RELATED APPLICATIONS

This application is a continuation of U.S. patent application Ser. No. 11/593,762 filed on Nov. 7, 2006, which is a continuation-in-part application claiming priority to U.S. patent application Ser. No. 10/970,042 filed on Oct. 21, 2004 which is a continuation of U.S. patent application Ser. No. 09/942,130 filed on Aug. 29, 2001 which claims priority to U.S. Patent Application No. 60/229,008 filed Aug. 30, 2000.

FIELD OF THE INVENTION

The present invention relates to a protocol adapter for transferring diagnostic signals between a vehicle network and a computer.

BACKGROUND OF THE INVENTION

With the inclusion of electronic networks on motorized vehicles, it has become necessary to transmit the data from the vehicle network to a remote location. Typically, the vehicle network is interfaced with personal computers or PC gateways for data acquisition, computer-based measurement, and automation systems from the vehicle network. However, when hardware components are upgraded, existing software can become non-compatible with the upgraded hardware. Manufacturers of various tools attempted to remedy these compatibility problems by using a box to talk to multiple data links. This was not very satisfactory and a better solution to this problem was needed.

Therefore, it is desirable to develop an adapter which is capable of communicating with multiple vehicle protocols and connectors to transmit diagnostic data from a vehicle network to a host computer.

SUMMARY OF THE INVENTION

The present invention relates to a protocol adapter for transferring diagnostic signals between a vehicle network and a computer including a vehicle connector, a common connector, and a common electronics package. The vehicle connector is interfaced with the vehicle network. The common connector plate is interfaced with the vehicle connector. The common electronics package is interfaced with the common connector plate, and wirelessly transmits diagnostic signals from the vehicle network to the computer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 illustrates DPA III Plus CPU board in accordance with an embodiment of the present invention;

FIG. 9 illustrates Discrete Output Latch in accordance with an embodiment of the present invention;

FIG. 10 illustrates Unused Spare Gates in accordance with an embodiment of the present invention;

FIG. 20 illustrates Unused Gates in accordance with an embodiment of the present invention;

FIG. 21 illustrates LED No. 1 description in accordance with an embodiment of the present invention;

FIG. 22 illustrates LED No. 2 description in accordance with an embodiment of the present invention;

FIG. 23 illustrates LED No. 3 description in accordance with an embodiment of the present invention;

FIG. 24 illustrates LED No. 4 description in accordance with an embodiment of the present invention;

FIG. 25 illustrates LED No. 5 description in accordance with an embodiment of the present invention;

DETAILED DESCRIPTION OF THE PREFERRED EMBODIMENTS

Figure 2A:
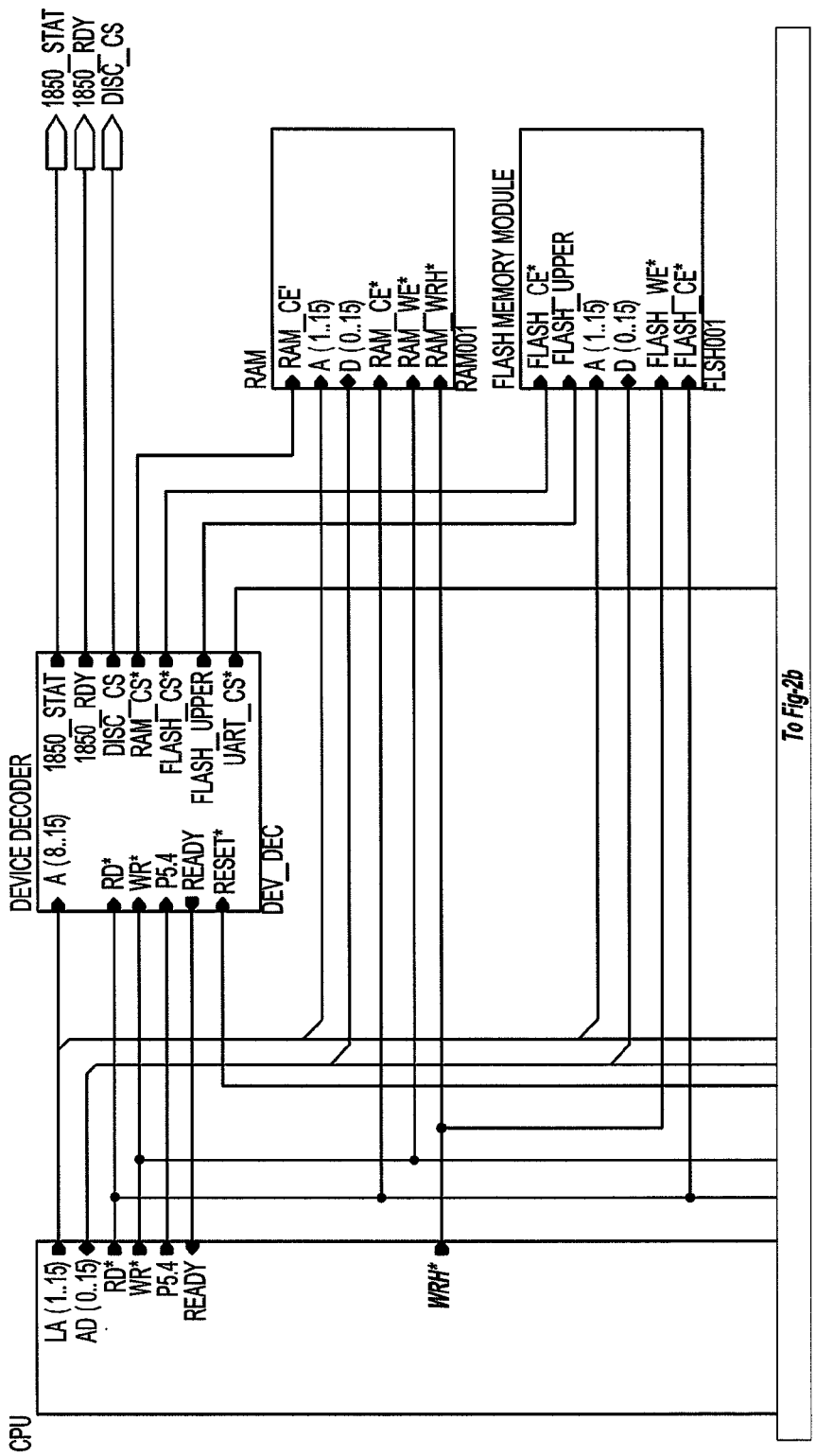
FIG. 2 illustrates CPU Memory Module in accordance with an embodiment of the present invention.
Figure 2B:
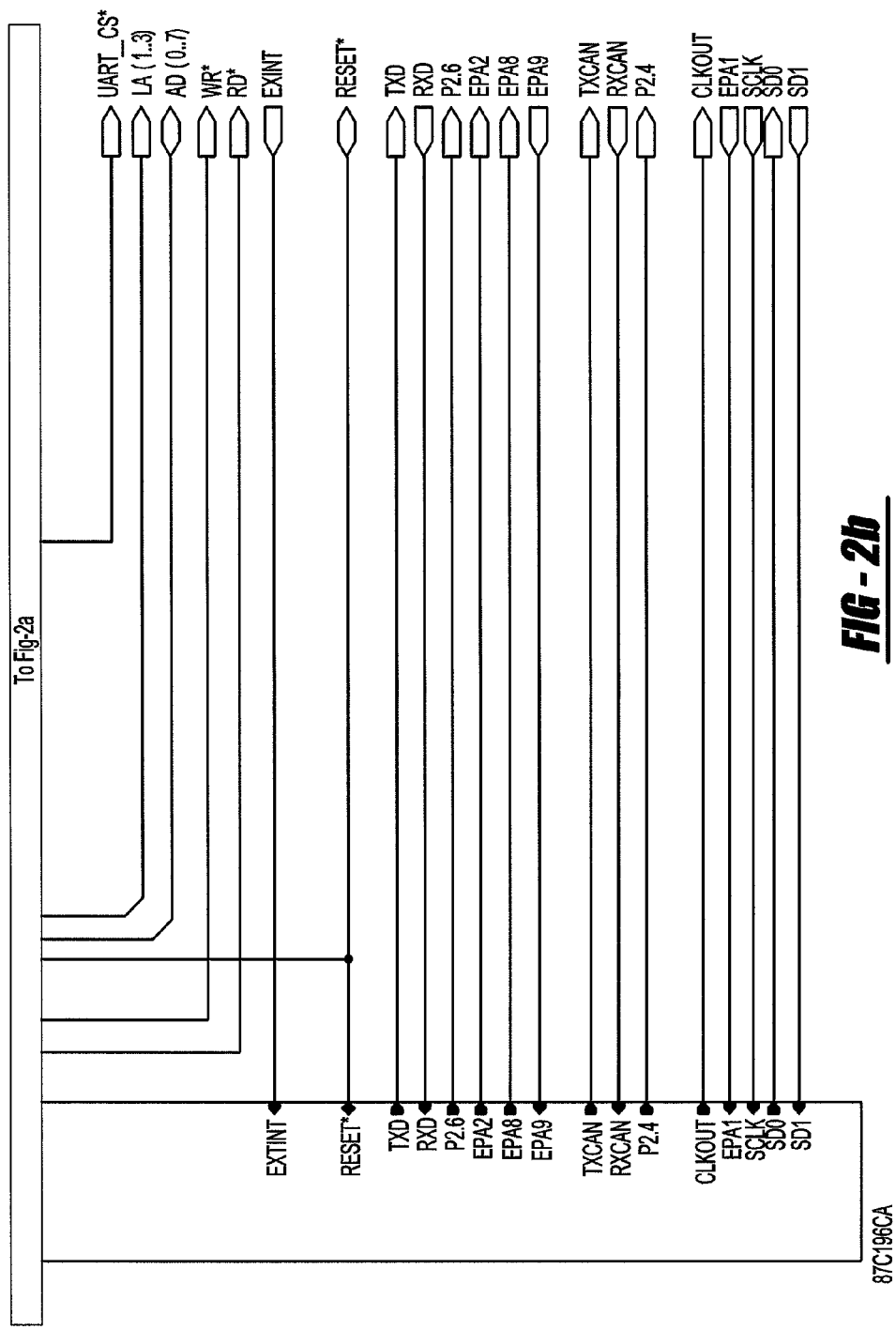
Figure 3A:
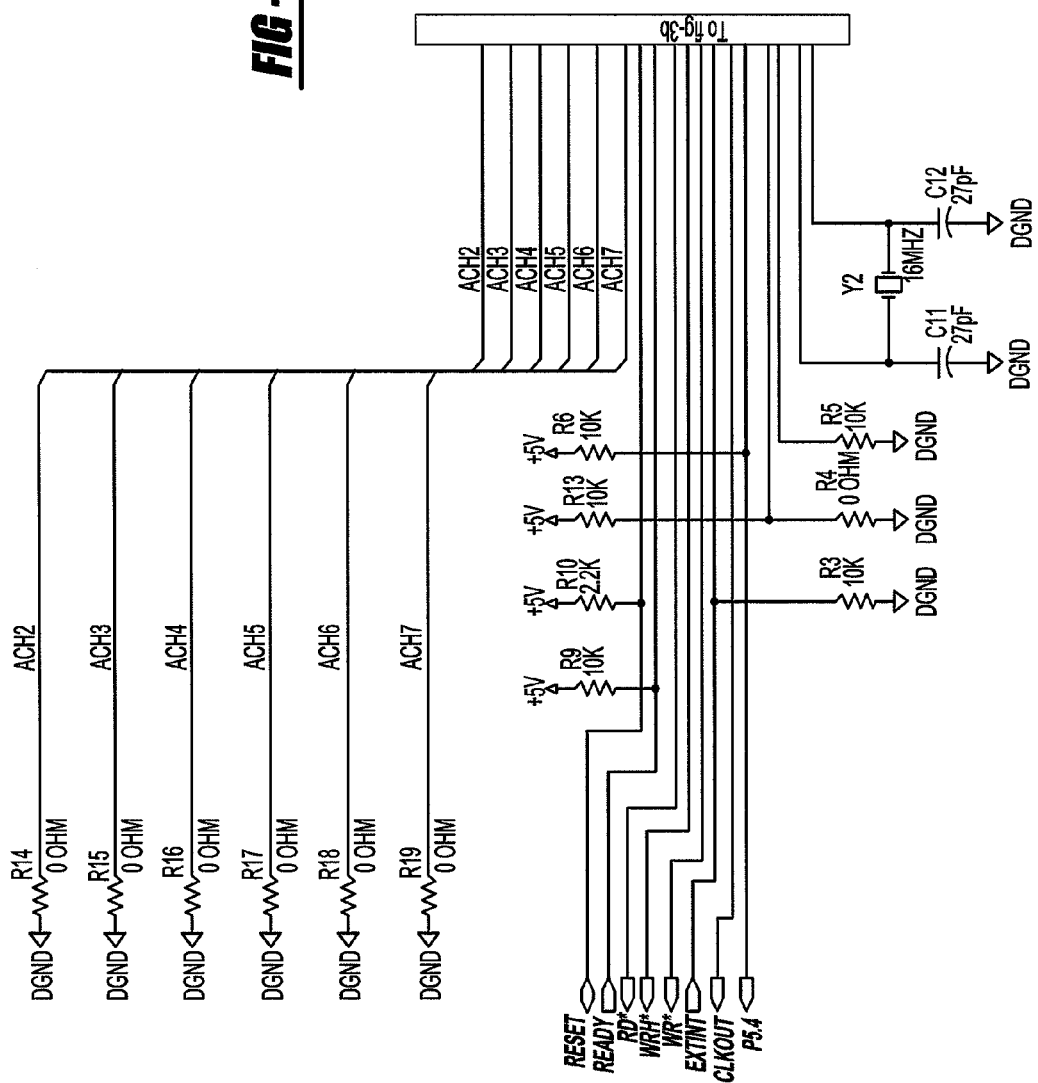
FIG. 3 illustrates Central Processing Unit in accordance with an embodiment of the present invention.
Figure 3B:
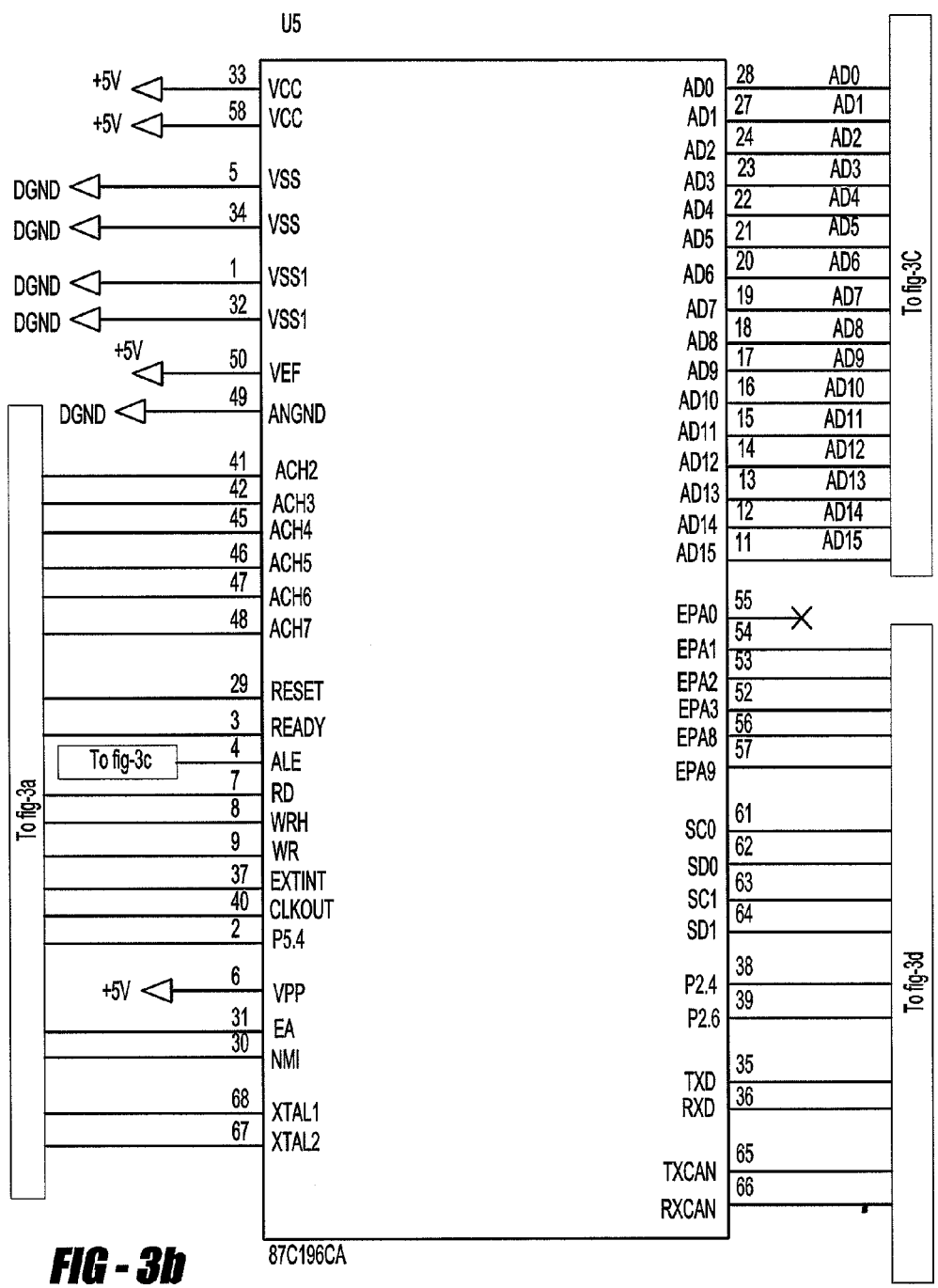
Figure 3C:
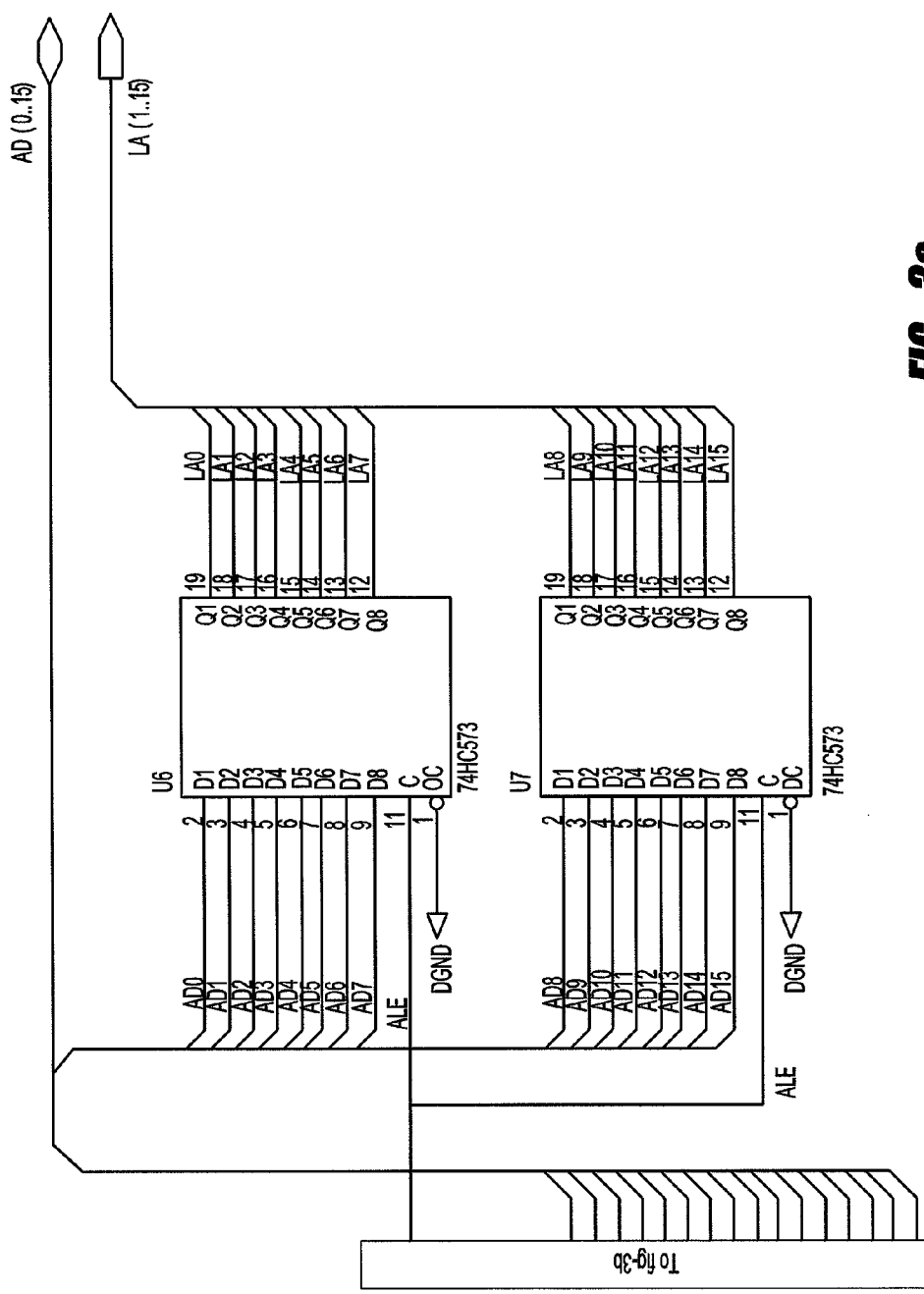
Figure 3D:
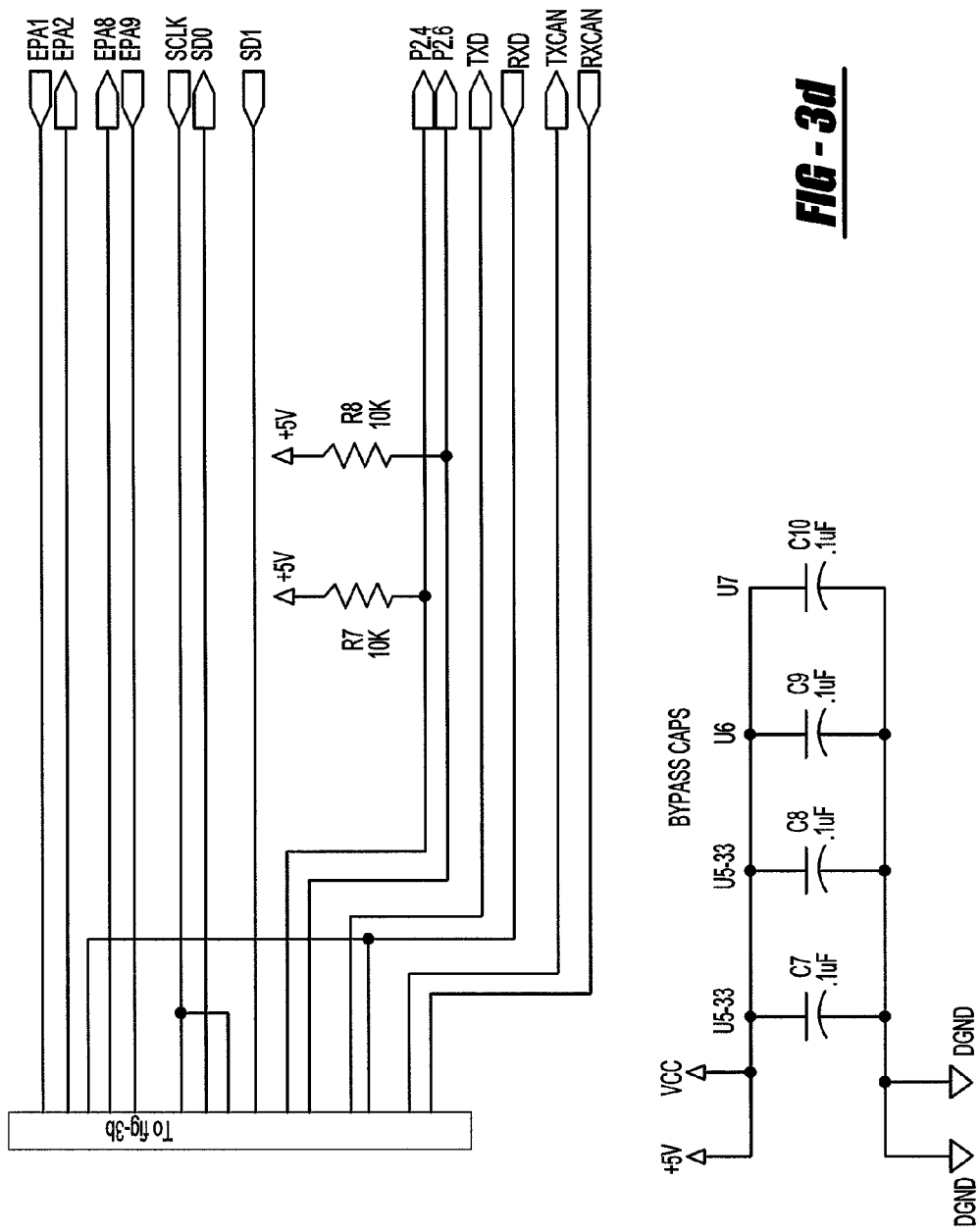
Figure 4:
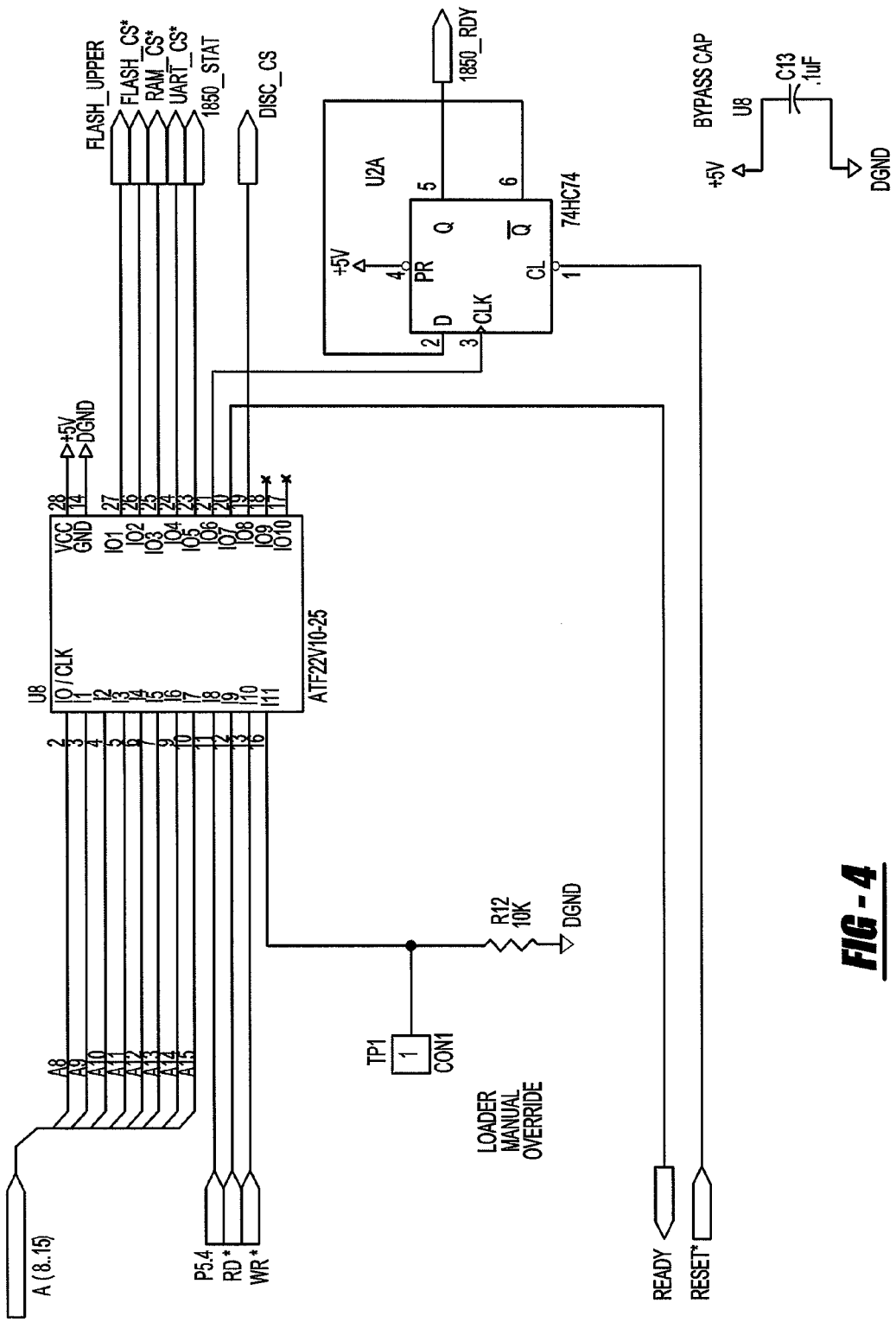
FIG. 4 illustrates Device Decoder in accordance with an embodiment of the present invention.
Figure 5:
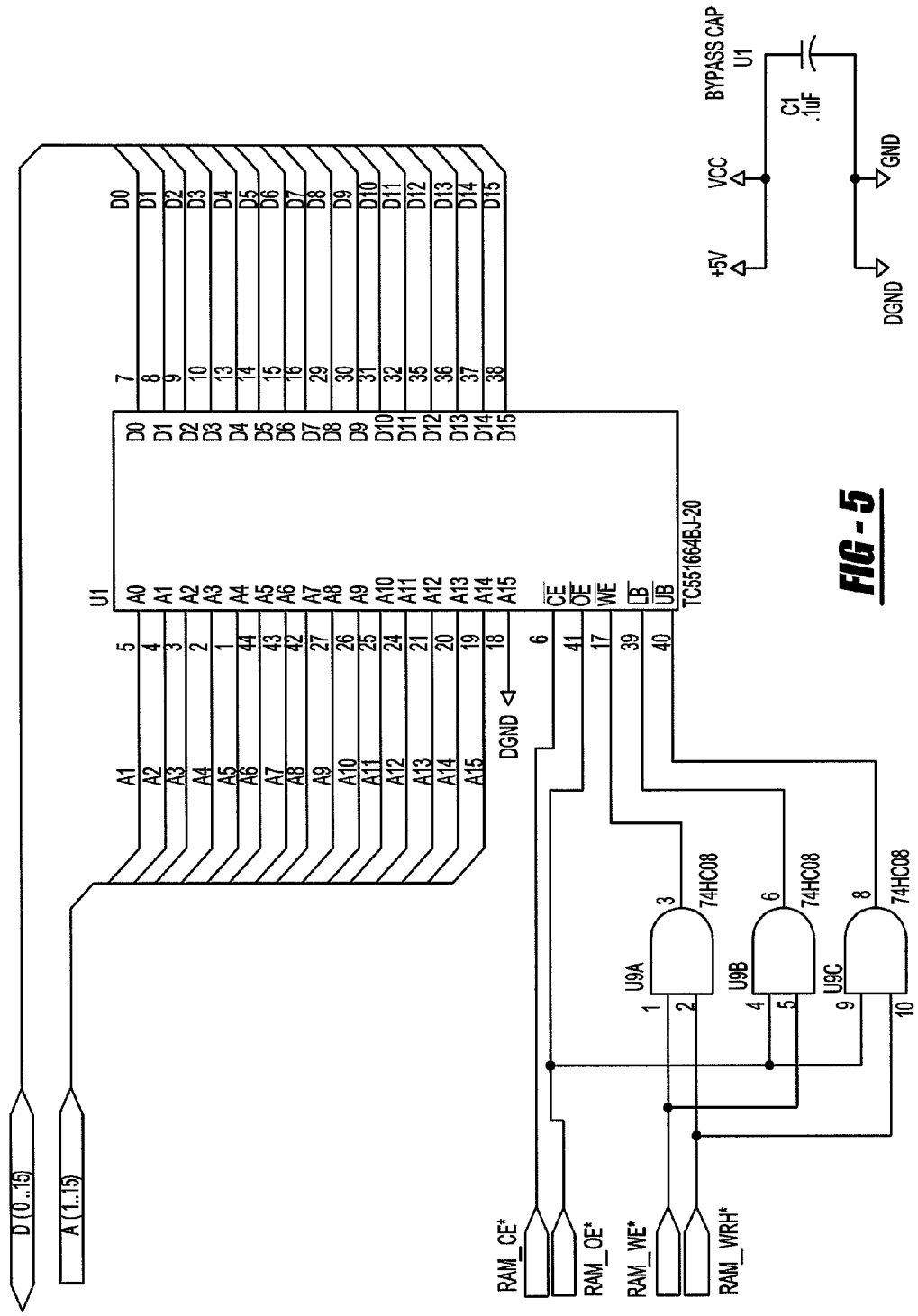
FIG. 5 illustrates static RAM Module in accordance with an embodiment of the present invention.
Figure 6:
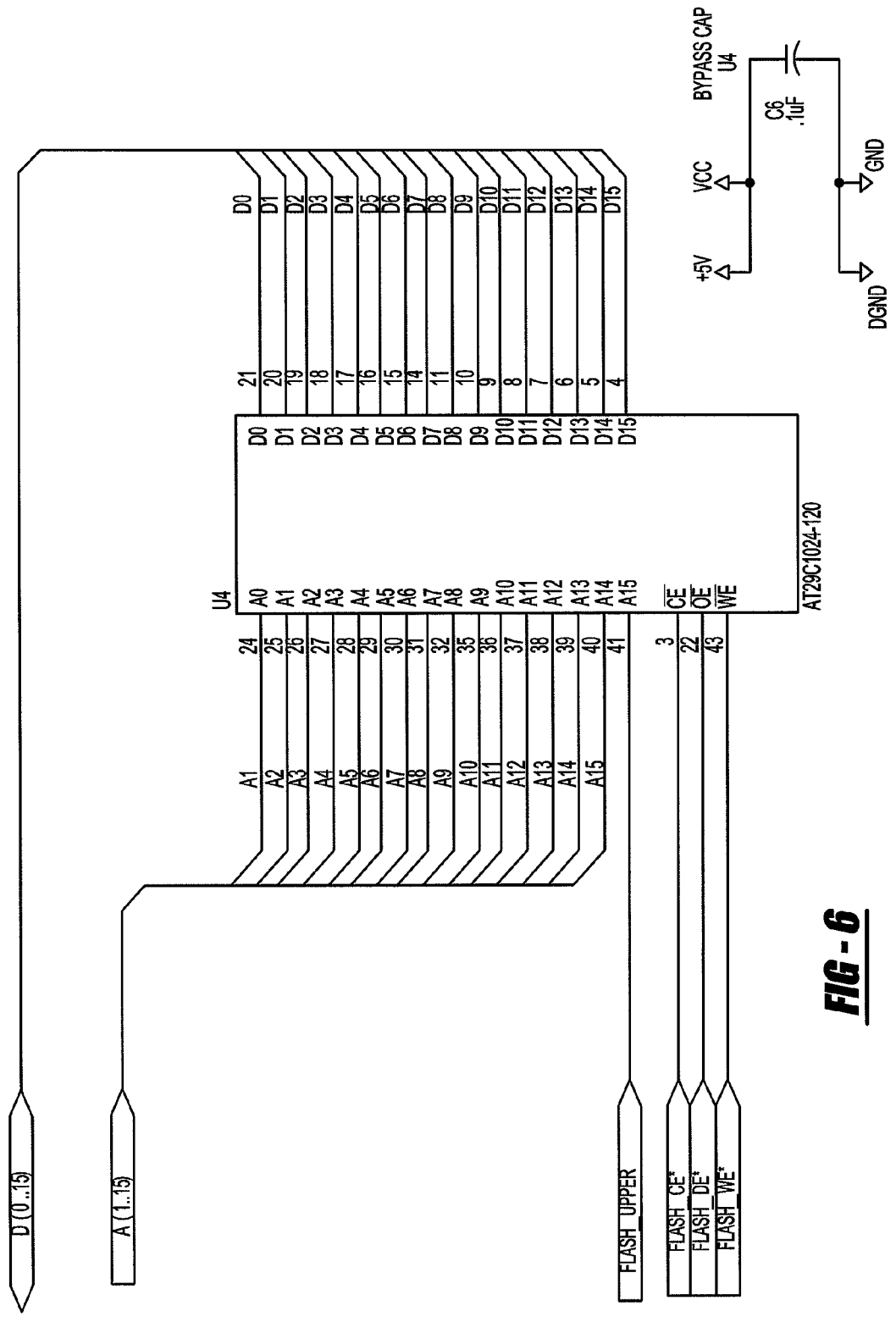
FIG. 6 illustrates Flash Memory Module in accordance with an embodiment of the present invention.
Figure 7:
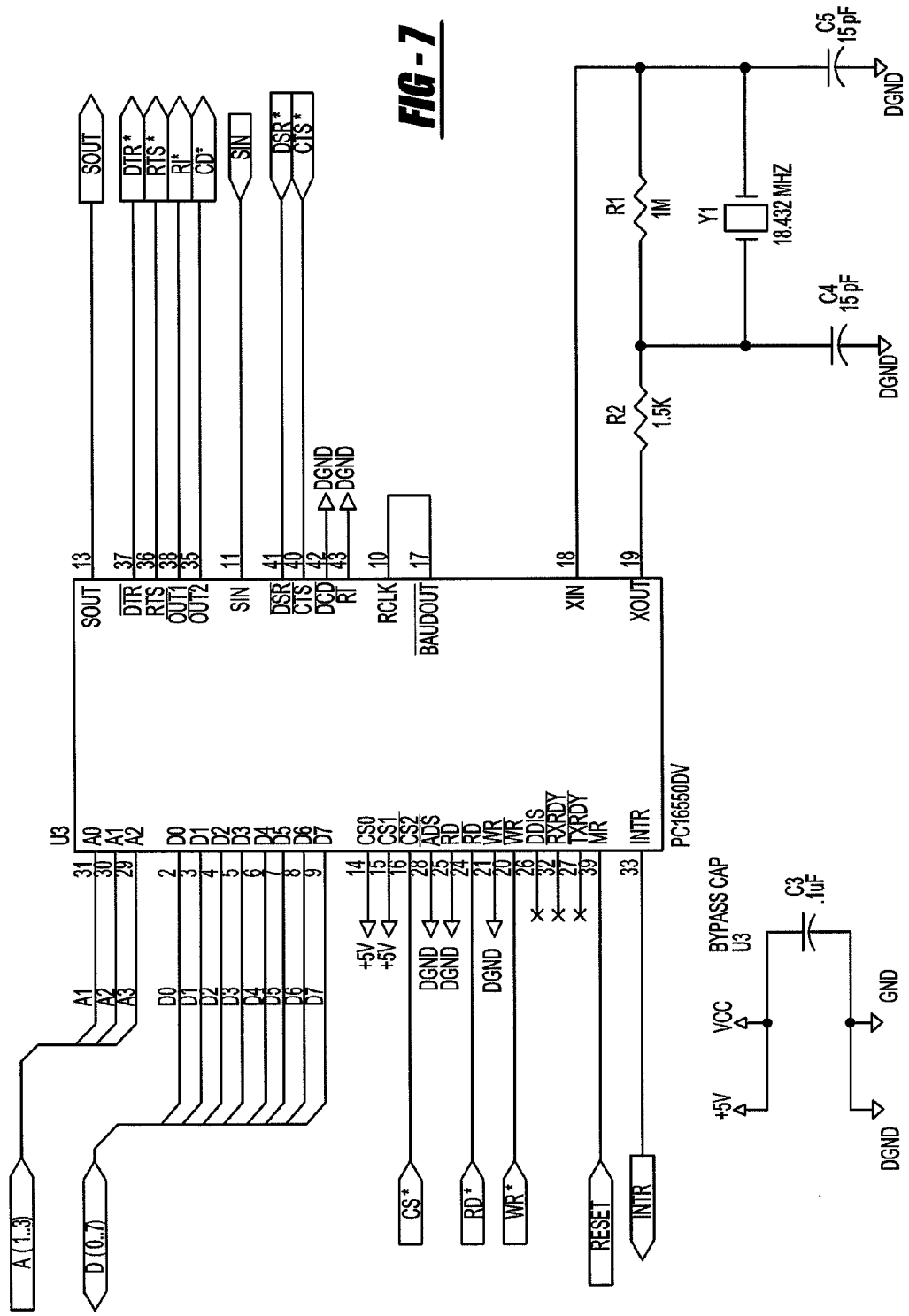
FIG. 7 illustrates UART in accordance with an embodiment of the present invention.
Figure 8B:
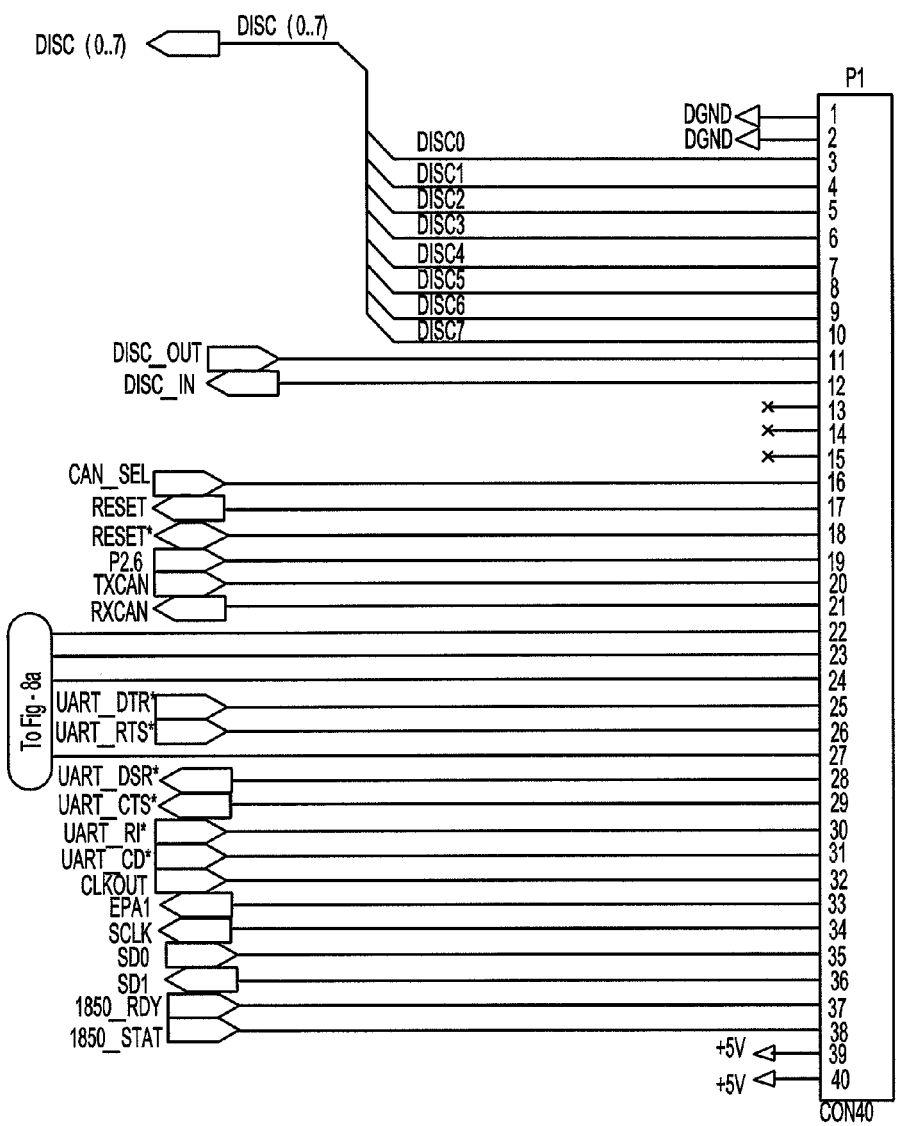
FIG. 8 illustrates CPU/I/O Interface Connectors in accordance with an embodiment of the present invention.
Figure 11B:
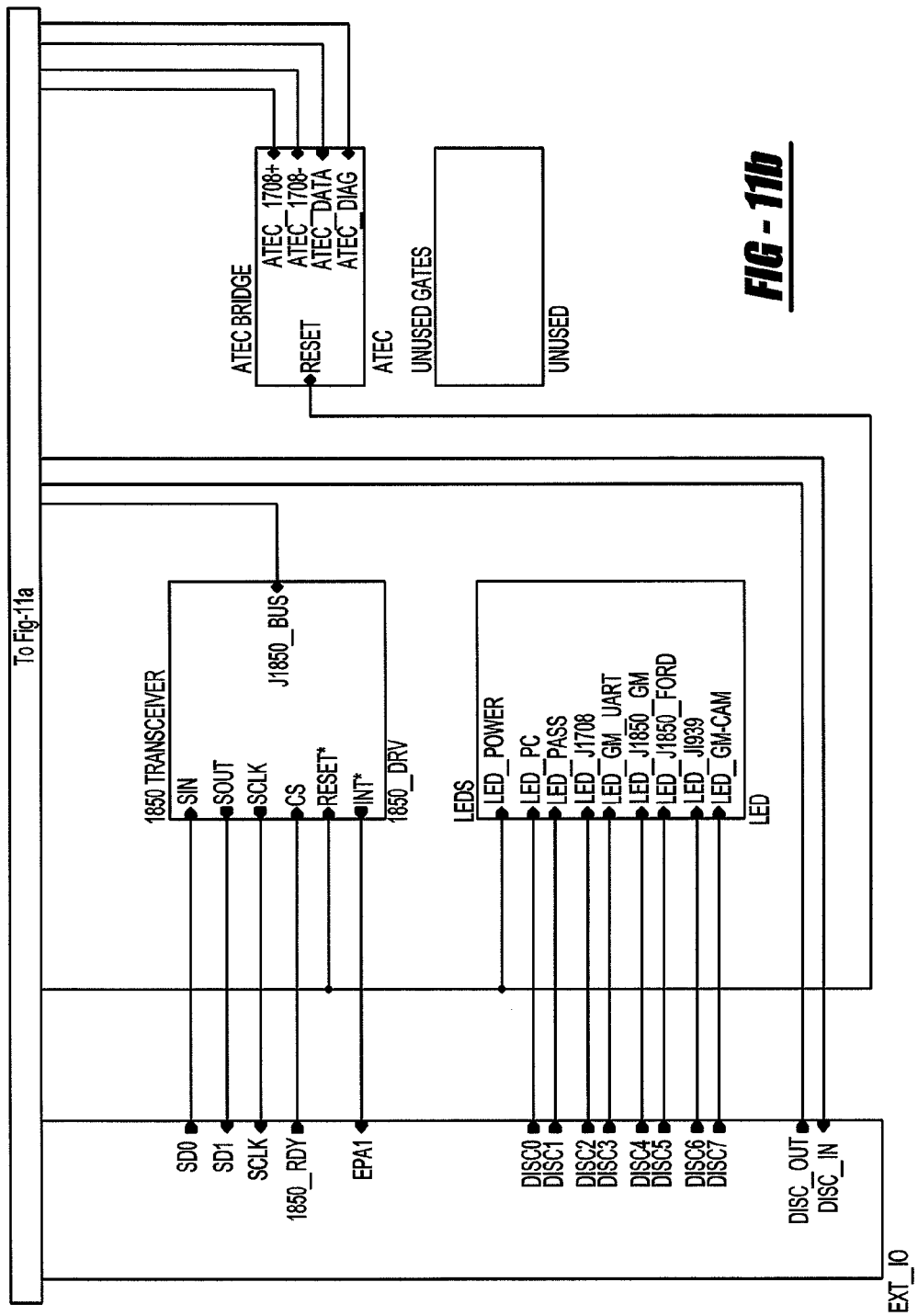
FIG. 11 illustrates DPA I/O Board in accordance with an embodiment of the present invention.
Figure 12:
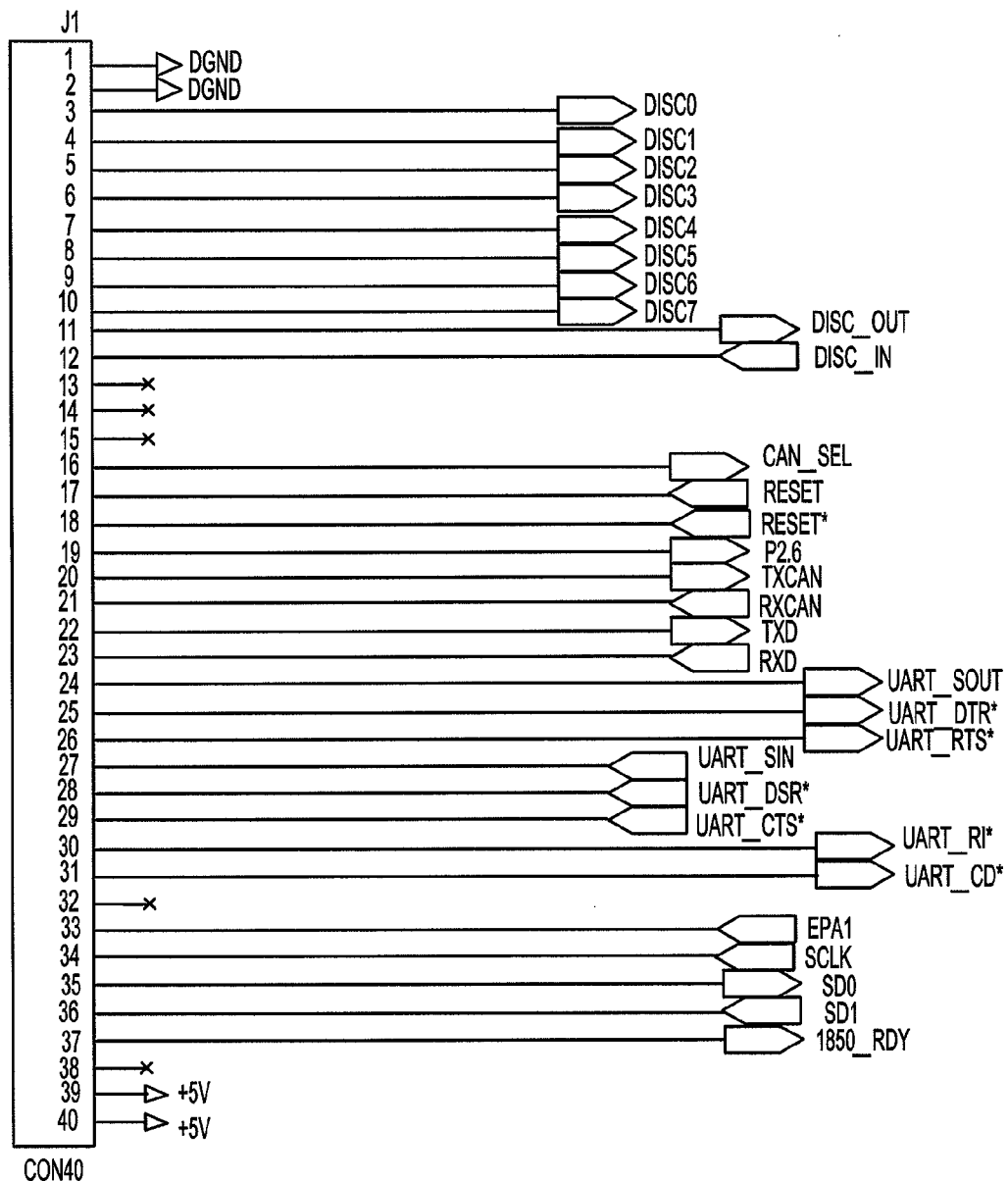
FIG. 12 illustrates I/O Interface Connector in accordance with an embodiment of the present invention.
Figure 13:
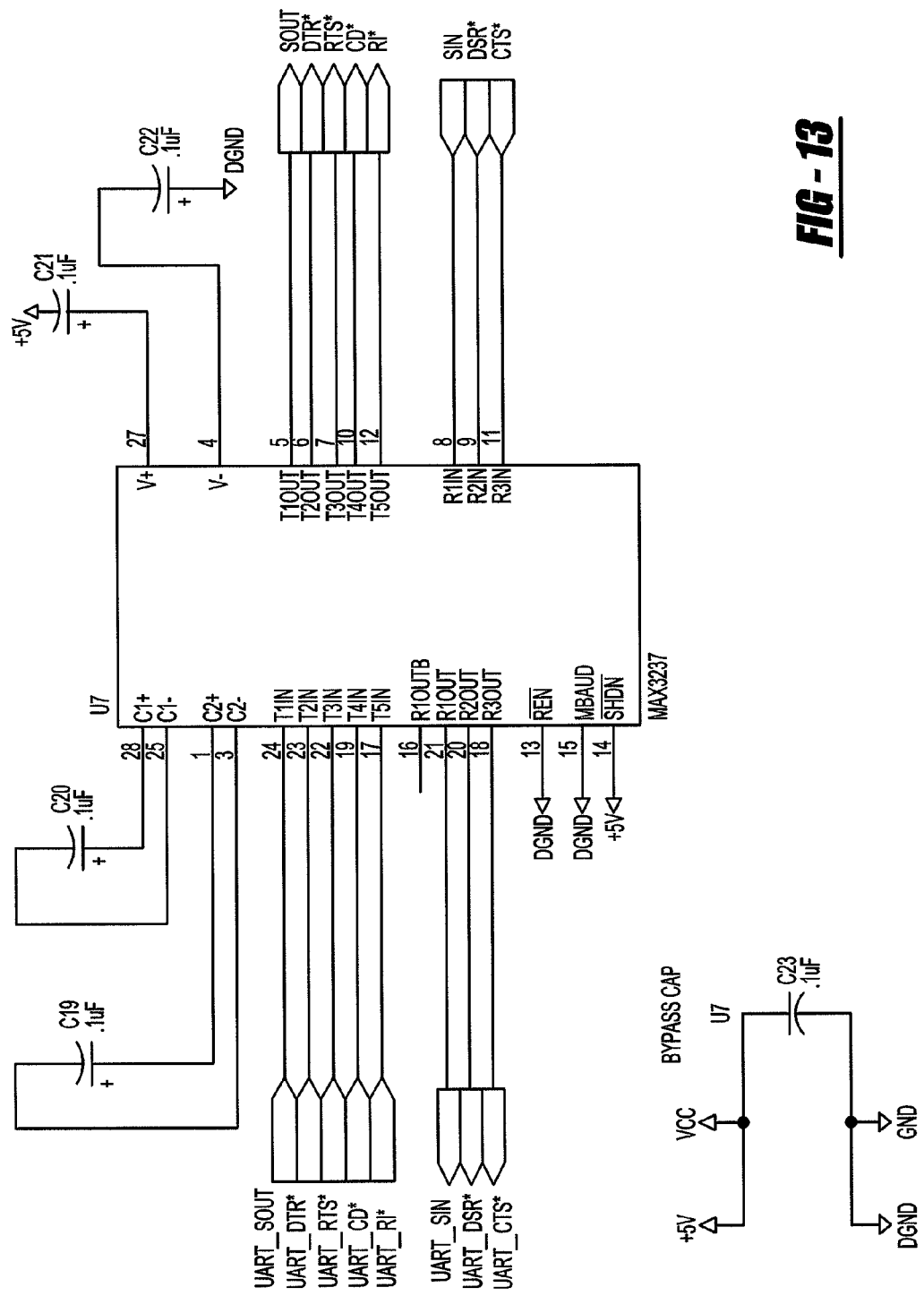
FIG. 13 illustrates RS-232 Transceivers in accordance with an embodiment of the present invention.
Figure 14:
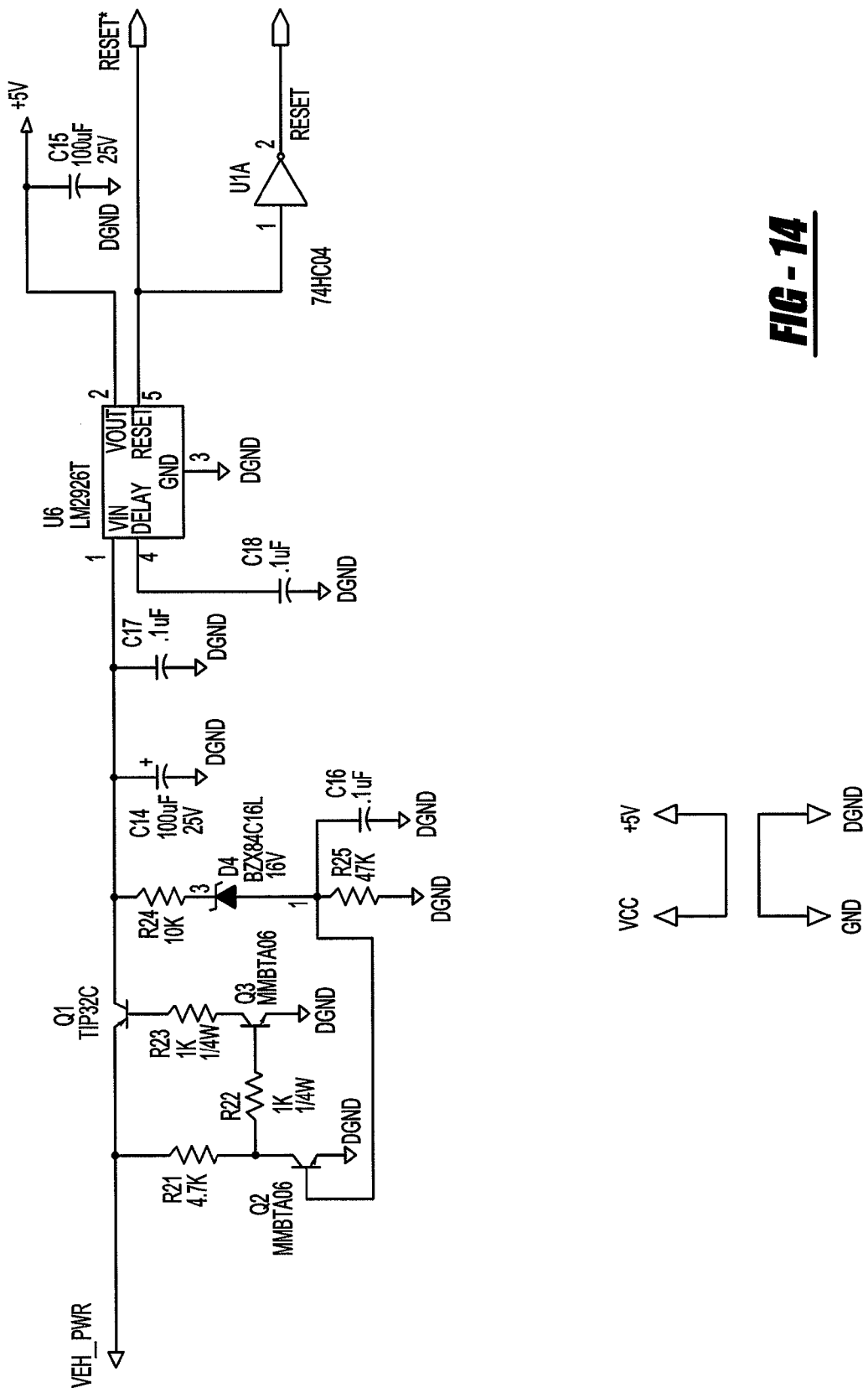
FIG. 14 illustrates Power Supply Regulator in accordance with an embodiment of the present invention.
Figure 15:
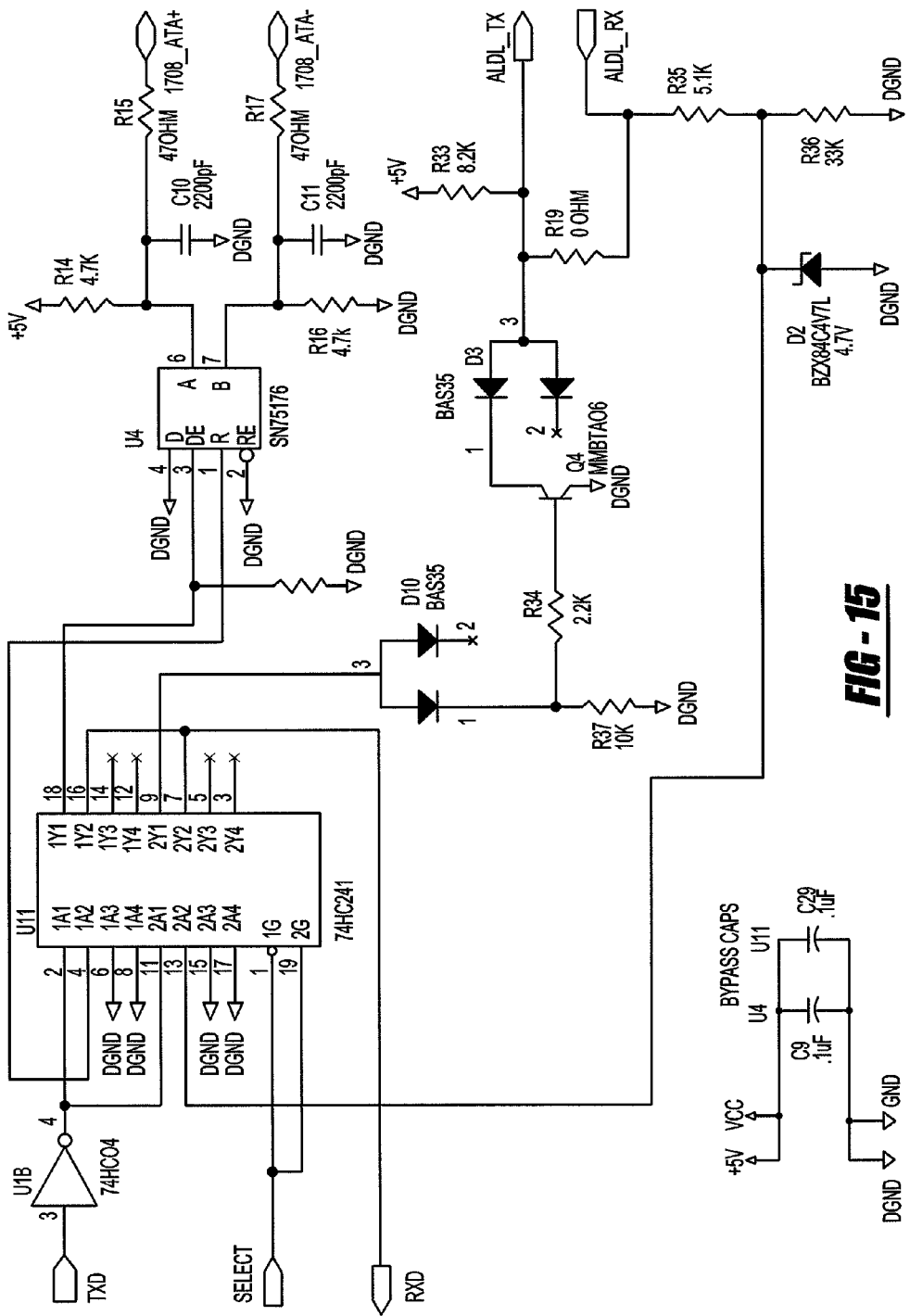
FIG. 15 illustrates 1708 Transceiver in accordance with an embodiment of the present invention.
Figure 16:
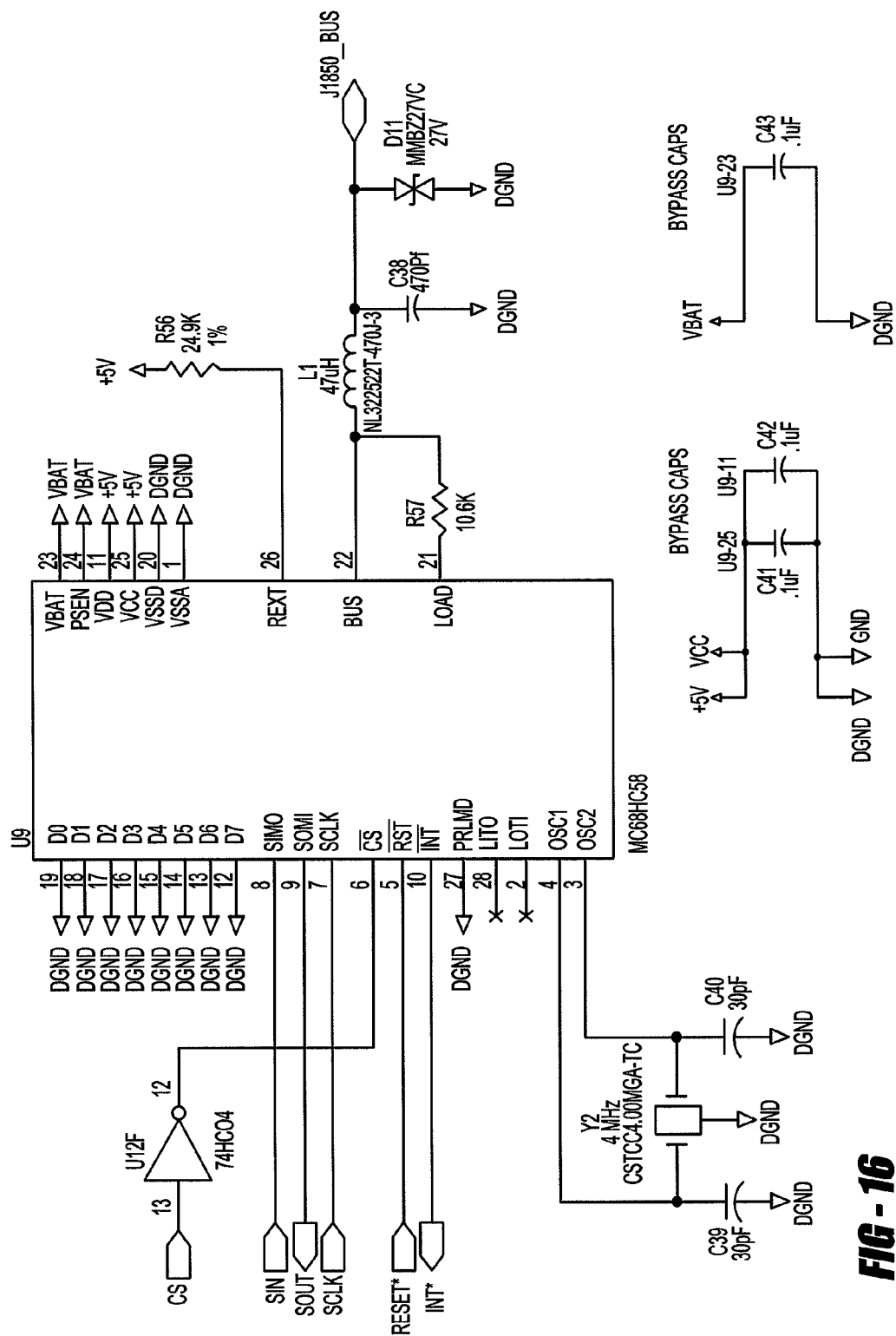
FIG. 16 illustrates J1850 Transceiver in accordance with an embodiment of the present invention.
Figure 17:
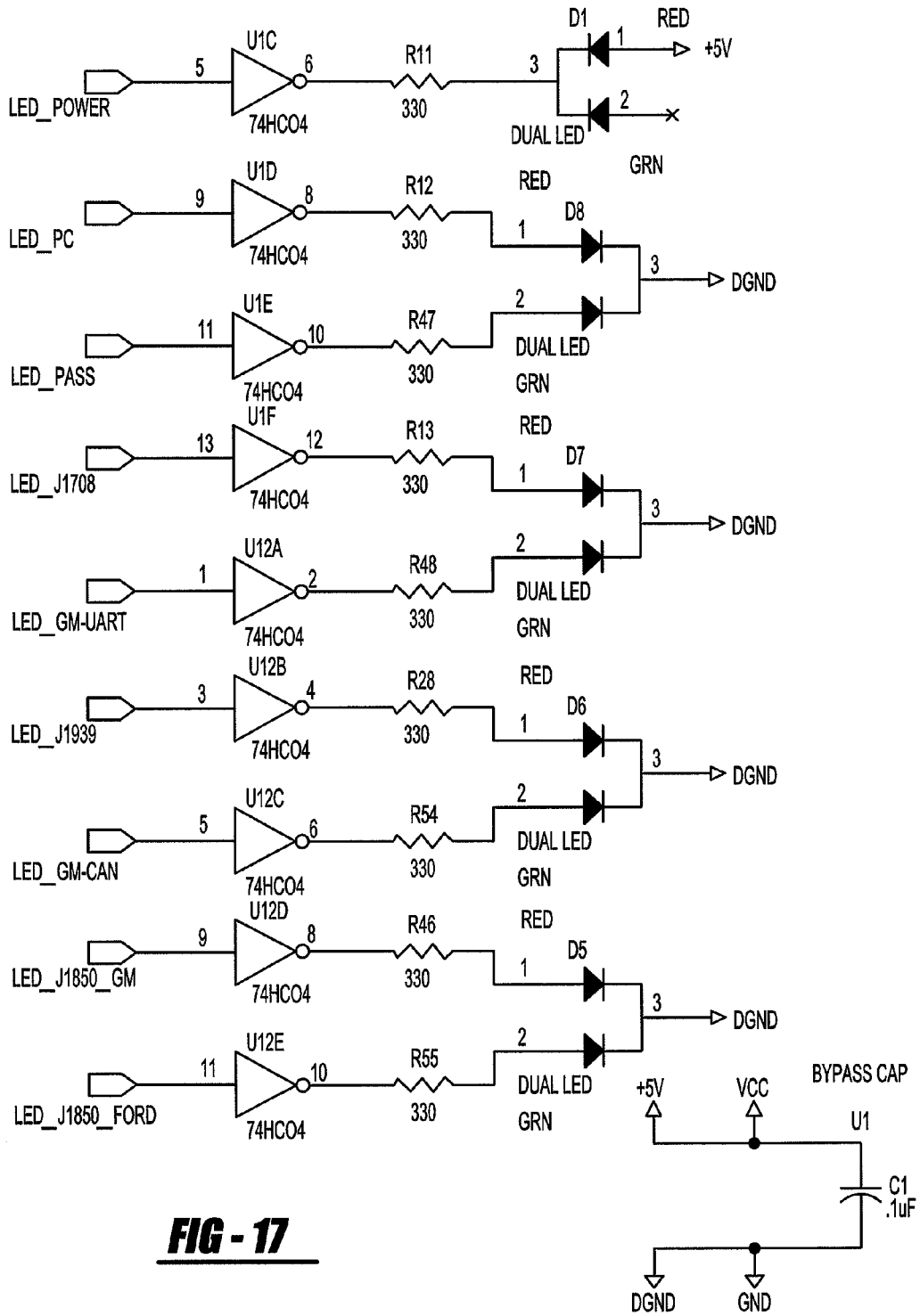
FIG. 17 illustrates LED Indicators in accordance with an embodiment of the present invention.
Figure 18:
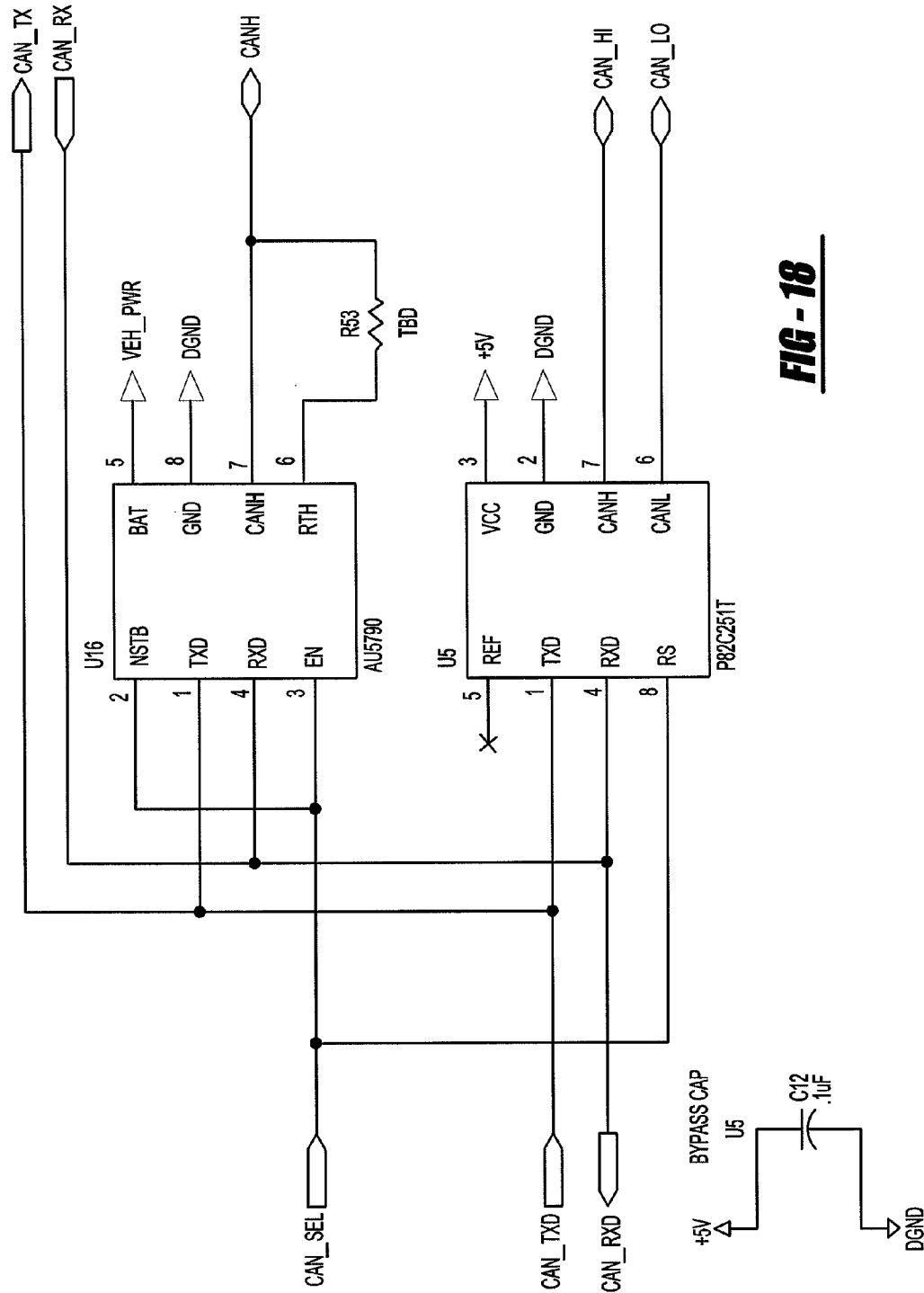
FIG. 18 illustrates CAN Transceiver in accordance with an embodiment of the present invention.
Figure 19A:
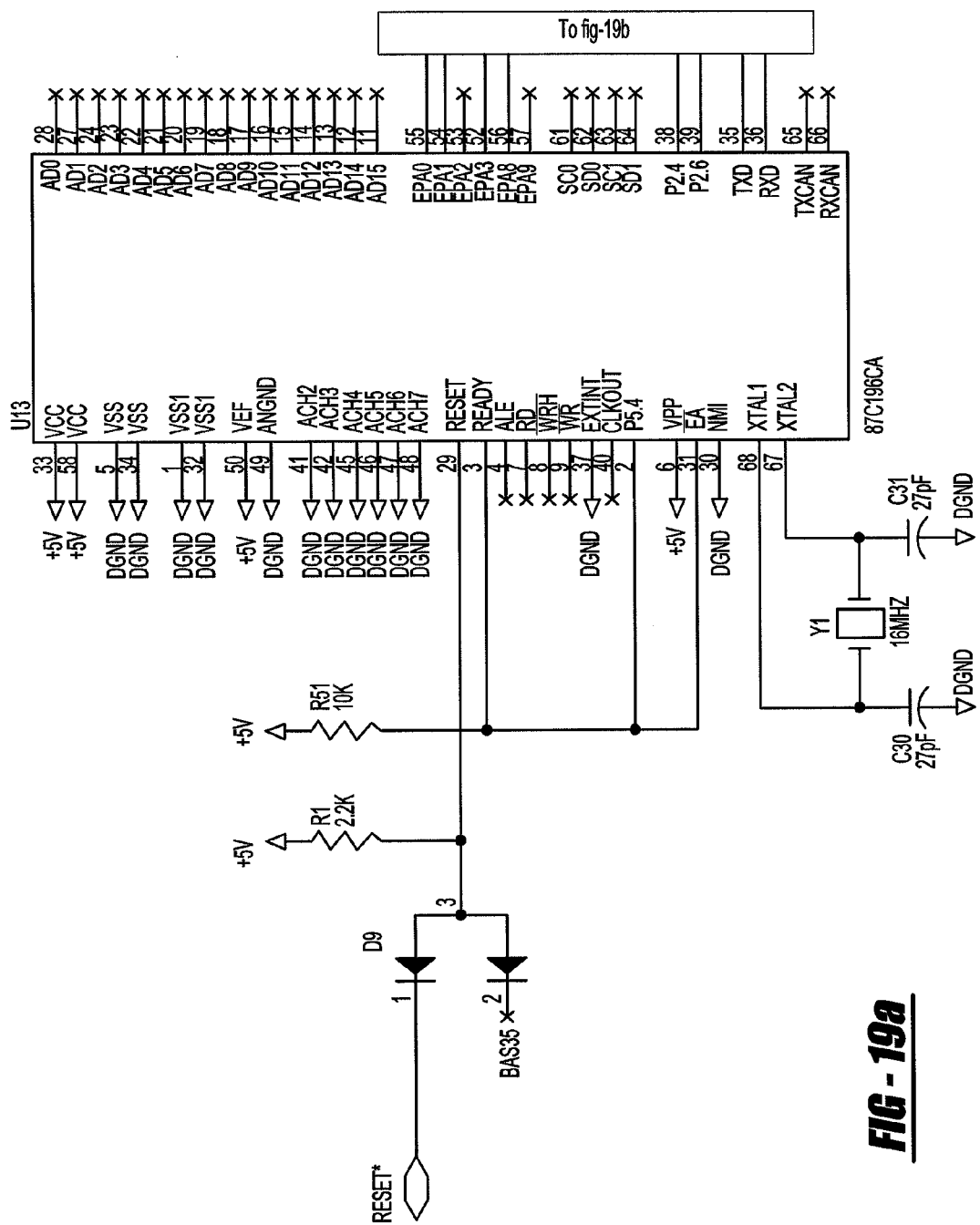
FIG. 19 illustrates ATEC to J1708 Bridge in accordance with an embodiment of the present invention.
Figure 19B:
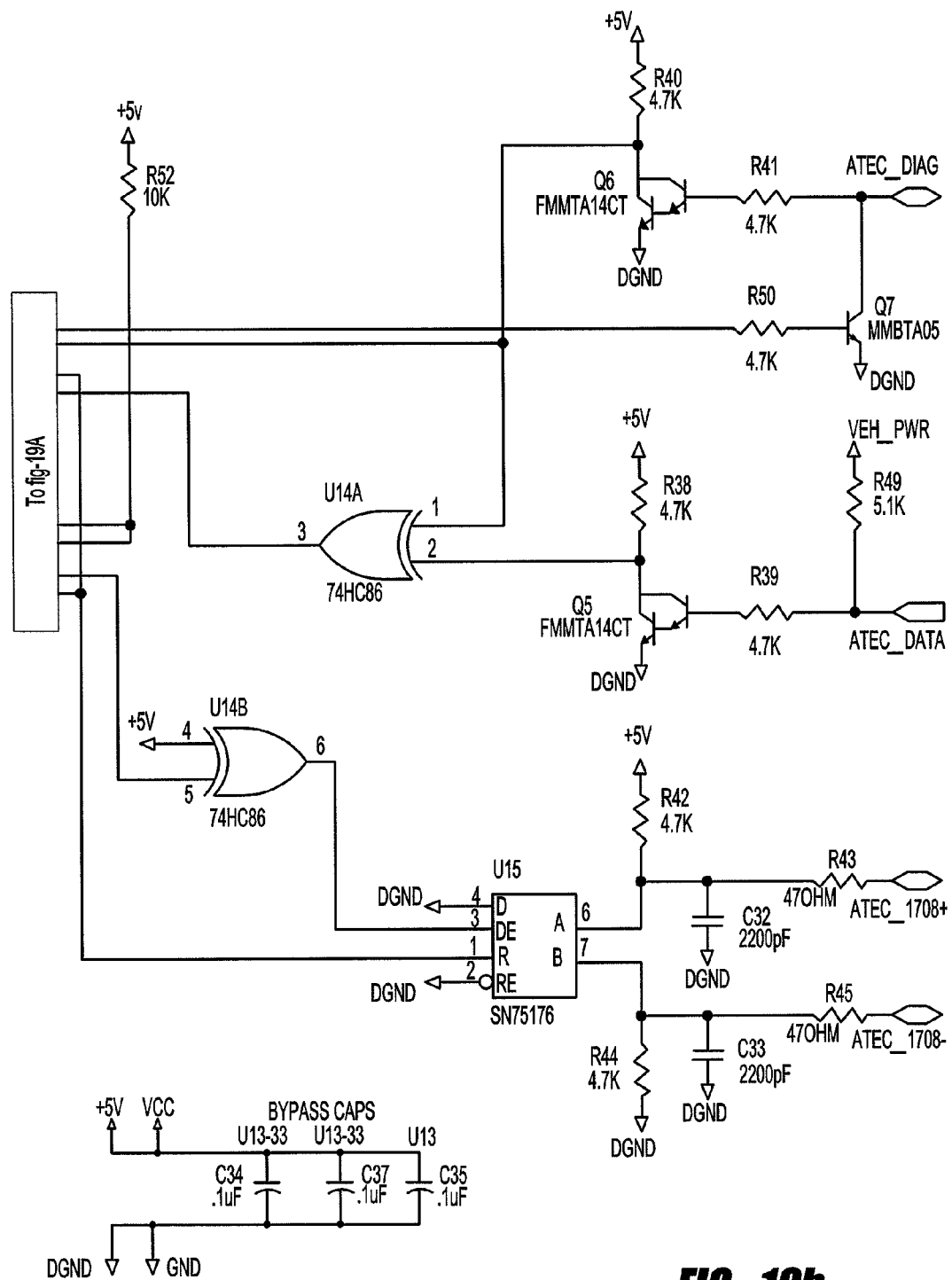

The following description of the preferred embodiment(s) is merely exemplary in nature and is in no way intended to limit the invention, its application, or uses.

The expanded protocol adapter of the invention supports the following protocols:

ATEC;
GMUART;

HALDEX;
J1708;
J1939;
SAE J1850 GM Class 2 protocol;
SAE J1850 Chrysler protocol (future activation supported);
GM Class 1 UART (ALDL) protocol;
ISO 9141-2 protocol;
ISO 9141-1989 protocol;
ISO 9141-Special protocol (for Case Corp.);
SAE J2284, Dual-Wire CAN protocol; and
SAE J2411, Single Wire CAN protocol (future activation supported).

The protocol adapter of the invention includes a special pass-through mode that allows users to continue utilizing yesterday's in-house software, while communicating with today's hardware. Older software packages such as RP1202 and RP1210 can still be employed. This feature allows users to replace aging hardware with an interface that can support existing software. Consequently, users can replace old hardware with the protocol adapter of the invention and yet maintain computability with their original's software.

The earlier protocol adapter supported SAE J1780, SAE J1939, and Control-Area Networks (CAN). The earlier adapter has a voltage converter mode that supports RS-232-to-RS-485 voltage conversion. The normal RS-232 port allows direct access to the J1708/RS-485 link. The protocol adapter of the invention supports the listed prior protocol adapter features, including a library (DLL/VxD for Windows) and on-board flash for field upgrades. The protocol adapter of the invention also employs a pass-through mode which supports communication with "old" software packages (e.g. RP1202 and RP1210(A)).

The protocol adapter of the invention expands functionality and usage of the earlier protocol adapter and can be used with a half-slot ISA card or in a PC-104 card version.

The protocol adapter of the invention employs LED's to indicate status of the device, which mode of operation, and whether the adapter is in communication. By way of explanation and not limitation, dual color LED's are used to indicate which program is being executed by the protocol adapter. The pass-through ability to emulate other protocol adapters is indicated by a dual color LED to indicate the pass-through is functioning to emulate other protocol adapters. Beyond the normal use of LED's, eight visual indicators are four dual-color LEDs (red and green). Three of the dual-color LEDs serve to notify the user which one of the six, user-selectable protocols is in use at any given time. The fourth dual-color LED indicates the mode of operation for the protocol adapter, the DPA III Plus, referred to as "DPA" for normal mode (red) or "PASS" for pass-through mode (green). While operating in the pass-through mode, the protocol adapter additionally supports communications with various "older" software packages, such as RP1202 of RP1210, whereas in the normal mode, such additional support is not provided. Alternating red/green indicates reflash (reprogramming) is in progress.

The status of the LEDs indicate to the user the mode of operation for the device and which of the various protocols is currently active. The meaning of the LED indicator status will be described below.

It should be noted that earlier protocol adapters support communications with "older" protocols, but earlier protocol adapters do not provide an indication to the user as to which mode is being used (normal or pass-through).

Earlier protocol adapters used a single color LED that could only notify the user that there is RS232 bus activity between the device and the PC. The protocol adapter of the invention uses an LED in the same physical location, but a dual-color LED allows indication of which mode is being used. A red LED is used to indicate when power is applied to the unit.

The protocol adapter incorporates additional functionality for supporting the Dearborn Programmable Bridge (DPB) software. Compatibility with the DPB software allows this adapter to support translation of messages between any of the protocols currently in use, e.g., SAE J1939 to J1708. The addition of DPB capabilities is integrated into the functionality of the adapter in such a manner to the make the inclusion of support for these added capabilities transparent to the user.

The protocol adapter provides rapid access to any supported network by allowing the user to easily switch between protocols. This rapid access affords the user with the ability to monitor and translate messages between different protocols at the same time.

An ISA, half-card version and a PC-104 version of the protocol adapter provide most of the functionality as described herein except for two functions. The two functions not supported by the ISA half-card version and the PC-104 version of the protocol adapter are the pass-through mode of operation and the Dearborn Programmable Bridge (DPB) software compatibility.

The protocol adapter of the invention includes reflashing that allows the protocol adapter to be updated with new firmware in the field. This is accomplished by U5, U1, U8 and U4, which are shown in the figures. U5 (micro) processes a command sent to the protocol adapter by the host. It then copies the reflash instructions set (loader program) into RAM (U1) and then transfers control to that program (loader). The loader program responds to the commands from the host which allows the host computer to then clear and reprogram the Flash (U4). Once the reprogramming is complete, control is passed back to the flash program.

The protocol adapter of the invention has status lights that allow the operator to determine what program is being executed by a protocol adapter embedded micro. U5 and U10 will flash the LEDs on the I/O board in a predefined manner at power up to indicate what version of firmware is being executed.

The protocol adapter of the invention has a pass-through feature (voltage translator)/smart mode that allows the protocol adapter to emulate older boxes. In this mode of operation, the U5 (micro) delivers data directly form the J1708 Transceiver (U11 of I/O board) to the RS232 transceiver (U7 of I/O board) and monitors the data to provide J1708 defined timing signals on any or all of the RS232 hardware handshake lines.

The expanded protocol adapter can be used wirelessly to perform ECU fault code interrogation, communication with a remote network, vehicle maintenance status checks or trip performance data downloads, and improved asset control, logistics and inventory management, diagnostic support, and maintenance/scheduling.

An ISA version of the protocol adapter of the invention is a half slot card that supports CAN (J1939 and DeviceNet), SAE J1850, and GM UART protocols.

The protocol adapter has additional unique features including bank switching, file upgrade capability, LED status, multiple datalinks, embedded versions, programmable manufacture's name, software locks, asynchronous transmit and receive, programmable timer, and a scratch pad.

For bank switching, memory is swapped in and out of the processor's memory map to allow multiple programs to be run. For field upgrade capability, non-volatile memory can be programmed in the field to allow new software features to be added in the field. For LED status, LEDs are flashed in a unique sequence at power-up to indicated what version of firmware is being executed. Multiple data links may be supported at the same time. Firmware and hardware version numbers are available to the host to allow the host to determine current capabilities. The manufacturer's name is embedded in FLASH to allow VAR's to put in the name of the VAR's company.

Proprietary software lock/key may be burned into FLASH to allow use of the VAR's software. The protocol adapter is capable of receiving and transmitting asynchronously of host processor and can broadcast on transmit and filter on receive.

The protocol adapter has a programmable multi-function timer to support datalink communications. The scratch pad is a built-in remote access memory to allow the host to consolidate message data.

Features of the protocol adapter of the invention are supported for RP1202 and RP1210, J1708 and J1939, and J1939 transport Layer. The protocol adapter has a Real Time Clock, Standard COMM port connection, 7-32 Volt Supply and is CE compliant.

Now turning to the drawings, the circuits of the protocol adapter of the invention are shown in FIGS. 1 through 20.

The pass through/smart mode is U11 (shown on FIG. 8) and is controlled by U5 (shown on FIG. 3) to determine if the host PC is listening to the J1708 link, or if the host PC is wanting to have a slave session with the DPA (diagnostic tool).

The U5 micro (FIG. 3) at power up will flash LEDs 2, 3, 4, and 5 (FIG. 26) to allow the operator to know what version of software is running inside the protocol adapter or diagnostic tool (DPA).

Figure 26:
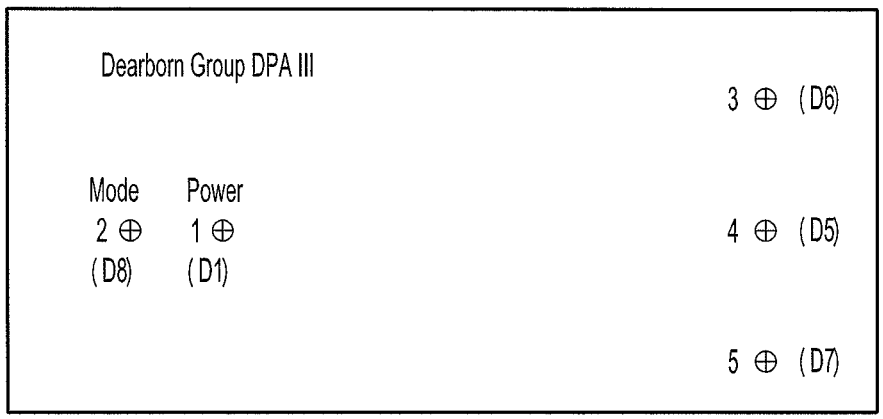
FIG. 26 illustrates LED layout diagram in accordance with an embodiment of the present invention.

Now turning to FIGS. 21 through 25, the LED descriptions are there shown with the LED diagram shown in FIG. 26.

Figure 27:
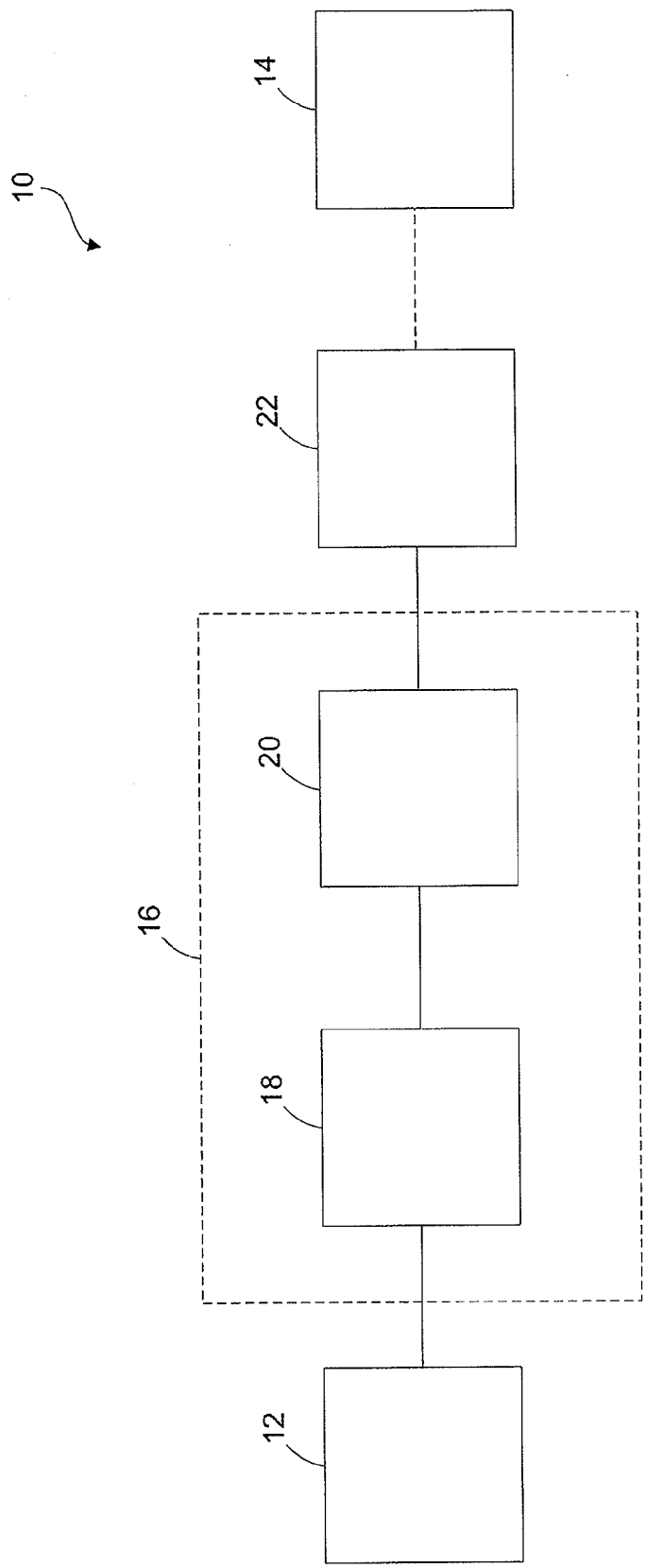
FIG. 27 is a schematic view of a protocol adapter in accordance with an embodiment of the present invention.
Figure 28:
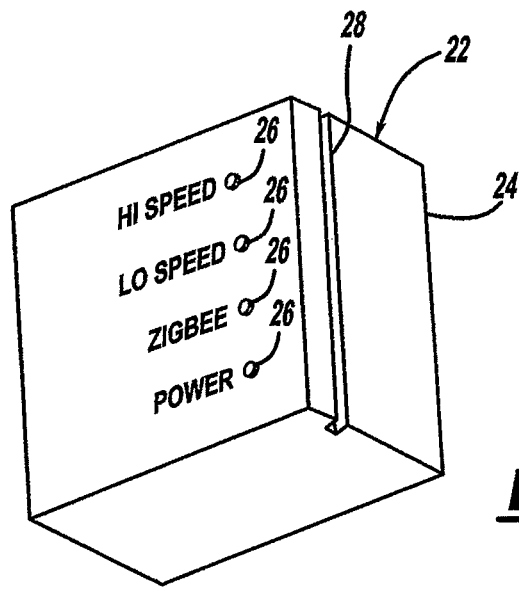
FIG. 28 is a front perspective view of a common electronics package in accordance with an embodiment of the present invention.
Figure 29:
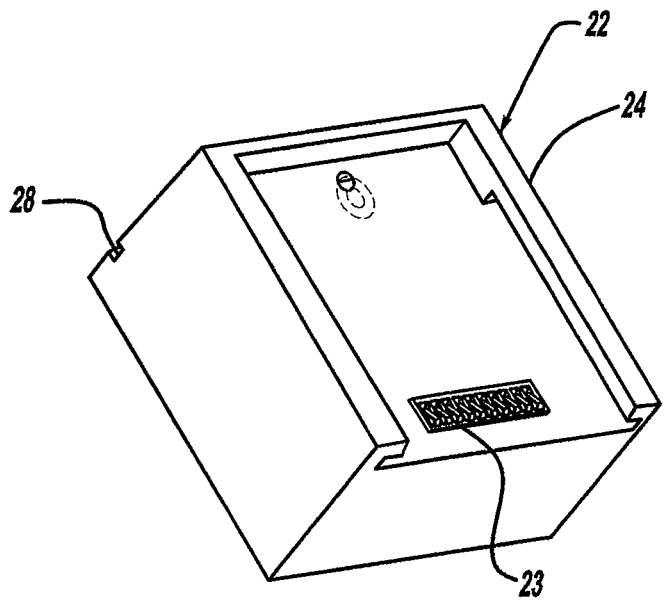
FIG. 29 is a rear perspective view of a common electronics package in accordance with an embodiment of the present invention.

In reference to FIGS. 27-29, the protocol adapter for transferring diagnostic signals is generally shown at 10. The protocol adapter 10 transfers the diagnostic signals between a vehicle network 12 and a host computer 14. A vehicle connector assembly generally indicated at 16 is interfaced with the vehicle network 12. The vehicle connector assembly 16 includes a vehicle connector 18 that is interfaced with the vehicle network 12. The vehicle connector assembly 16 also includes a common connector plate 20 that is interfaced with the vehicle connector 18. Thus, the vehicle connector assembly 16 mates or connects a specific vehicle connector 18 with the common connector plate 20. A common electronics package generally indicated at 22 is interfaced with the common connector plate 20, and the common electronics package 22 wirelessly transmits the diagnostic signals from the vehicle network 12 to the host computer 14. Typically, the common electronics package 22 has a plurality of pads 23 which connect to the common connector plate in order for the common connector plate 20 to communicate with the common electronics package 22.

As stated above, the protocol adapter 10 is capable of monitoring and translating multiple protocols that are used in the vehicle network 12. Thus, the common electronics package 22 determines a protocol of the vehicle network 12 that is being used. By way of explanation and not limitation, the common electronics package 22 determines the protocol by using a control logic which identifies the protocol or based upon the type of vehicle connector 18 that is being used since specific types of vehicle connectors 18 are typically used with a limited number of protocols. Additionally, the common electronics package 22 receives multiple protocols from the vehicle network 12 simultaneously. Further, the protocol adapter 10 is capable of monitoring and translating multiple protocols from the vehicle network 12 simultaneously.

The common connector plate 20 typically includes a plurality of pins which are accepted by the vehicle connector 18. Thus, when the common electronics package 22 determines what type of vehicle network 12 it is interfaced with and the type of vehicle connector 18 that is being used, the common electronics package 22 commands the common connector plate 20 to interface with the vehicle connector 18 using selected pins from the plurality of pins of the common connector plate 20.

The common electronics package 22 transmits the diagnostic signals to the host computer 14 using a selected wireless protocol. Typically, the common electronics package 22 is capable of transmitting signals in a plurality of wireless protocols, but a single wireless protocol is selected for transmitting the diagnostic signal based upon, among other things, the host computer 14 and the type of signal desired by the user. Thus, the host computer 14 can directly receive the wireless signal from the common electronics package 22 or can include a separate receiver that is interfaced with the host computer 14 by, but not limited to, a serial port, a USB port, or the like. By way of explanation and not limitation, the wireless protocol can be IEEE 802.15.1, Bluetooth, IEEE 802.15.4, Zigbee, IEEE 802.11a, IEEE 802.11b, IEEE 802.11g, or the like.

Alternatively, the common electronics package 22 is enclosed in a housing 24 or sealed in order to protect the common electronics package 22 from environmental elements, such as but not limited to, rain, snow, sleet, or the like. By having the common electronics package 22 enclosed in the housing 24, the common electronics package 22 can be permanently connected to the vehicle network 12 and does not have to be connected and disconnected between uses. The common electronics package 22 can also include LEDs 26 for indicating the operation mode of the common electronics package 22. By way of explanation and not limitation, the LEDs can be used to show that the common electronics package is powered, the type of wireless signal that is being transmitted, and the speed of the common electronics package 22 is operating. As stated above, the LEDs can be bi-colored to show different operation modes of the protocol adapter 10.

The common electronics package 22 can also include a reset switch 28. By way of explanation and not limitation, the reset switch 28 is a coin-switch which has two metal conductors. Thus, by sliding an electrically conducting object, such as but not limited to, a coin or the like, through a slot and connecting the two metal conductors, shorts the two contacts and closes the switch. By closing the reset switch 28, the common electronics package 22 is reset. By having such a reset switch 28, the housing 24 continues to be sealed while the common electronics package 22 can be reset.

By way of explanation and not limitation, the vehicle connector 18 is a 9-Pin Deutsch, 6-Pin Deutsch, 4-Pin Haldex, 6-Pin General Motors Universal Asynchronous Receiver Transmitter ("GMUART"), Assembly Line Diagnostic Link ("ALDL"), or the like. By way of explanation and not limitation, the common electronics package 22 supports a plurality of protocols, such as Allision Transmission Electronic Control ("ATEC"), GMUART, Haldex Traction Systems ("HALDEX"), made by Haldex Traction AB Box 505, SE-261 Landskrona, Sweden, J1708, J1939, SAE J1850 GM Class 2, SAE J1850 Chrysler, GM Class 1 UART (ALDL), ISO 9141-2, ISO 9141-1989, ISO 9141-Special protocol, SAE J2284, Dual Wire CAN protocol, SAE J2411, Single Wire CAN protocol, or the like.

It is beneficial to have a protocol adapter with a common electronics package 22 and common connector plate 20 because there is only a single product that supports all vehicle networks 12. Thus, this reduces the manufacturing costs of the number of spare parts that must be stocked. For example, since the common electronics package 22 is separate from the vehicle connector assembly 16, a lesser number of common electronics packages 22 needs to be stocked when compared to the vehicle connector assembly 16 which vary depending upon the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A protocol adapter for transferring diagnostic signals between a vehicle network and a computer comprising;
   a vehicle connector interfaced with said vehicle network;
   a common connector plate connected to said vehicle connector by a plurality of pads; and
   a common electronics package interfaced with said common connector plate, wherein said common electronics package wirelessly transmits the diagnostic signals between the in-vehicle networks and the computer for a plurality of different protocols, wherein the protocol adapter has a normal operation mode and a pass through mode of operation;
   circuitry in the common electronics package that includes an ISA half-card or a PC-104 card that that do not support the pass-through mode of operation;
   a pass through bus feature in the circuitry of the common electronics package that emulates an older protocol adapter;
   a housing enclosing said common electronics package, wherein said housing and said common electronics package are permanently connected to the vehicle network and said housing seals the common electronics package from environmental elements; and
   a plurality of LEDs on the housing for indicating that signals are being transferred between the protocol adapter and the computer, said plurality of LEDs also indicate which of the plurality of protocols is being used, wherein when the protocol adapter is operating in the pass through mode of operation, the normal operation of the protocol adapter is suspended and one of the plurality of LEDs illuminates indicating that the protocol adapter is operating in a pass through mode.

2. The protocol adapter of claim 1, wherein said common electronics package determines a protocol of said vehicle network that is being used.

3. The protocol adapter of claim 1, wherein said common electronics package receives multiple said protocols of said vehicle network simultaneously.

4. The protocol adapter of claim 1 further comprising a plurality of pins on said common connector plate, wherein said plurality of pins are accepted by said vehicle connector.

5. The protocol adapter of claim 4, wherein said common electronics package commands said common connector plate to communicate with said vehicle network using selected said plurality of pins based upon said vehicle connector.

6. The protocol adapter of claim 1, wherein said common electronics package transmits said diagnostic signals in a selected wireless protocol.

7. The protocol adapter of claim 1, wherein said common electronics package further comprises a reset switch.

8. The protocol adapter of claim 1, wherein said vehicle connector is one of a group consisting of:
   9-Pin Deutsch;
   6-Pin Deutsch;
   4-Pin Haldex;
   6-Pin GMUART; and
   ALDL.

9. The protocol adapter of claim 1, wherein said common electronics package supports a plurality of protocols selected from a group consisting of:
   ATEC;
   GMUART;
   HALDEX;
   J1708;
   J1939;
   SAE J1850 GM CLASS;
   SAE J1850 Chrysler;
   GM Class 1 UART (ALDL);
   ISO 9141-2;
   ISO 9141-1989;
   ISO 9141;
   SAE J2284, Dual-Wire CAN; and
   SAE J2411, Single Wire CAN.

10. A protocol adapter for transferring diagnostic signals between a vehicle network and a computer comprising;
    a vehicle connector interfaced with said vehicle network;
    a common connector plate having a plurality of pins accepted by said vehicle connector;
    a common electronics package connected to said common connector plate by a plurality of pads, wherein said common electronics package has a reset switch and wirelessly transmits the diagnostic signals between the in-vehicle networks and the computer for a plurality of different protocols, wherein the protocol adapter has a normal operation mode and a pass through mode of operation;
    circuitry in the common electronics package that includes an ISA half-card or a PC-104 card that that do not support pass-through mode of operation;
    a pass through bus feature in the circuitry of the common electronics package that emulates an older protocol adapter;
    a housing enclosing said common electronics package, wherein said housing and said common electronics package are permanently connected to the vehicle network and said housing seals the common electronics package from environmental elements; and
    a plurality of LEDs on the housing for indicating that signals are being transferred between the protocol adapter and the computer, said plurality of LEDs also indicate which of the plurality of protocols is being used, wherein when the protocol adapter is operating in pass through mode of operation, the normal operation of the protocol adapter is suspended and one of the plurality of LEDs illuminates indicating that the protocol adapter is operating in a pass through mode.

11. The protocol adapter of claim 10, wherein said common electronics package determines a protocol of said vehicle network that is being used.

12. The protocol adapter of claim 11, wherein said common electronics package receives multiple said protocols of said vehicle network simultaneously.

13. The protocol adapter of claim 10, wherein said common electronics package commands said common connector plate to communicate with said vehicle network using selected said plurality of pins based upon said vehicle connector.

14. The protocol adapter of claim 10, wherein said common electronics package transmits said diagnostic signals in a selected wireless protocol.

15. The protocol adapter of claim 10, wherein said vehicle connector is one of a group consisting of:
9-Pin Deutsch;
6-Pin Deutsch;
4-Pin Haldex;
6-Pin GMUART; and
ALDL.

16. The protocol adapter of claim 10, wherein said common electronics package supports a plurality of protocols selected from a group consisting of:
ATEC;
GMUART;
HALDEX;
J1708;
J1939;
SAE J1850 GM CLASS;
SAE J1850 Chrysler;
GM Class 1 UART (ALDL);
ISO 9141-2;
ISO 9141-1989;
ISO 9141;
SAE J2284, Dual-Wire CAN; and
SAE J2411, Single Wire CAN.

17. A protocol adapter for transferring diagnostic signals between a vehicle network and a computer comprising;
a vehicle connector interfaced with said vehicle network;
a common connector plate having a plurality of pins accepted by said vehicle connector;
a common electronics package connected to said common connector plate by a plurality of pads, wherein said common electronics package has a reset switch, wirelessly transmits said diagnostic signals from said vehicle network to said computer in a selected wireless protocol, and commands said common connector plate to communicate with said vehicle network using selected plurality of pins, wherein the common electronics package wirelessly transmits signals between the in-vehicle networks and the computer for a plurality of different protocols, wherein the protocol adapter has a normal operation mode and a pass through operation mode;
circuitry in the common electronics package that includes an ISA half-card or a PC-104 card that that do not support pass-through mode of operation;
a pass through bus feature in the circuitry of the common electronics package that emulates an older protocol adapter; and
a plurality of LEDs on the housing for indicating that signals are being transferred between the protocol adapter and the computer, said plurality of LEDs also indicate which of the plurality of protocols is being used, wherein when the protocol adapter is operating in pass through mode of operation, the normal operation of the protocol adapter is suspended and one of the plurality of LEDs illuminates indicating that the protocol adapter is operating in a pass through mode.

18. The protocol adapter of claim 17, wherein said common electronics package determines a protocol of said vehicle network that is being used.

19. The protocol adapter of claim 18, wherein said common electronics package receives multiple said protocols of said vehicle network simultaneously.

20. The protocol adapter of claim 17, wherein said vehicle connector is one of a group consisting of:
9-Pin Deutsch;
6-Pin Deutsch;
4-Pin Haldex;
6-Pin GMUART; and
ALDL.

21. The protocol adapter of claim 17, wherein said common electronics package supports a plurality of protocols selected from a group consisting of:
ATEC;
GMUART;
HALDEX;
J1708;
J1939;
SAE J1850 GM CLASS;
SAE J1850 Chrysler;
GM Class 1 UART (ALDL);
ISO 9141-2;
ISO 9141-1989;
ISO 9141;
SAE J2284, Dual-Wire CAN; and
SAE J2411, Single Wire CAN.

* * * * *